US012634994B2

(12) United States Patent     (10) Patent No.:   US 12,634,994 B2

Ly et al.     (45) Date of Patent:    May 19, 2026

---

(54) UPLINK CONTROL INFORMATION (UCI) MULTIPLEXED IN UPLINK MESSAGE WITH UPLINK MESSAGE REPETITION

(71) Applicant: QUALCOMM Incorporated, San Diego, CA (US)

(72) Inventors: Hung Dinh Ly, San Diego, CA (US); Kexin Xiao, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 18/251,946

(22) PCT Filed: Jan. 15, 2021

(86) PCT No.: PCT/CN2021/072147

§ 371 (c)(1),
(2) Date: May 5, 2023

(87) PCT Pub. No.: WO2022/151350

PCT Pub. Date: Jul. 21, 2022

(65) Prior Publication Data

US 2024/0008090 A1     Jan. 4, 2024

(51) Int. Cl.
*H04W 74/0833*     (2024.01)
*H04W 74/00*     (2009.01)

(52) U.S. Cl.
CPC ..... *H04W 74/0833* (2013.01); *H04W 74/004* (2013.01)

(58) Field of Classification Search
CPC ............. H04W 74/004; H04W 74/006; H04W 74/0833; H04W 72/20; H04W 72/21;
(Continued)

(56) References Cited

U.S. PATENT DOCUMENTS

| 2019/0068317 A1 | 2/2019 | Babaei et al. |
| 2020/0107370 A1 | 4/2020 | Wei et al. |
| | (Continued) | |

FOREIGN PATENT DOCUMENTS

| CN | 109391382 A | 2/2019 |
| CN | 110113818 A | 8/2019 |
| | (Continued) | |

OTHER PUBLICATIONS

CATT: "Correction for UCI on Msg3 PUSCH," 3GPP TSG-RAN WG1 #102-e, R1- 2005661, e-Meeting, Aug. 17-28, 2020, Aug. 28, 2020 (Aug. 28, 2020), section of reason for change, 4 pages.
(Continued)

*Primary Examiner* — Paul H. Masur
(74) *Attorney, Agent, or Firm* — Shumaker & Sieffert, P.A.

(57) ABSTRACT

Aspects of the disclosure relate to random access procedures. In one example, a user equipment (UE) can multiplex an uplink (UL) message with uplink control information (UCI) on a data region of a first slot and transmit the multiplexed UL message with the UCI to a base station in UL transmission or UL retransmission as part of the random access procedure. The UE may further employ UL message repetition to be transmitted with the multiplexed UL message with the UCI. The base station may receive the multiplexed UL message with the UCI with or without UL message repetition. Other aspects, embodiments, and features are also claimed and described.

30 Claims, 10 Drawing Sheets

(58) Field of Classification Search

CPC ...... H04W 72/23; H04L 5/003; H04L 5/0044; H04L 5/0053; H04L 5/0094; H04L 1/08; H04L 1/1671; H04L 1/1864; H04L 1/189; H04L 1/1896

See application file for complete search history.

(56) References Cited

U.S. PATENT DOCUMENTS

| | | | |
|---|---|---|---|
| 2020/0351129 A1 | 11/2020 | Kwak et al. | |
| 2021/0410192 A1* | 12/2021 | Ly ......................... | H04W 72/23 |
| 2022/0150984 A1* | 5/2022 | Taherzadeh Boroujeni ................ | H04L 1/1864 |
| 2022/0225360 A1* | 7/2022 | Yi ...................... | H04W 72/1268 |
| 2022/0345271 A1* | 10/2022 | Wu ................... | H04W 74/0833 |
| 2023/0023656 A1* | 1/2023 | Rastegardoost .. | H04W 72/0446 |
| 2023/0189278 A1* | 6/2023 | Ying ................... | H04W 72/566 370/329 |
| 2023/0247680 A1* | 8/2023 | Seok ..................... | H04L 5/0012 |
| 2024/0049234 A1* | 2/2024 | Yoshimura ............ | H04L 5/0053 |
| 2024/0080909 A1* | 3/2024 | Bae ......................... | H04L 1/189 |

FOREIGN PATENT DOCUMENTS

| | | | |
|---|---|---|---|
| WO | 2019103942 | | 5/2019 |
| WO | 2019151819 | A1 | 8/2019 |
| WO | 2020092227 | | 5/2020 |
| WO | 2020216332 | A1 | 10/2020 |

OTHER PUBLICATIONS

CATT: "Correction for UCI on Msg3 PUSCH and MsgA PUSCH," 3GPP TSG-RAN WG1 #103-e, e-Meeting, R1-2007802, Oct. 26-Nov. 13, 2020, Nov. 13, 2020 (Nov. 13, 2020), section of reason for change, 6 pages.

ERICSSON: "On Remaining Issues on UCI Multiplexing on PUSCH," 3GPP TSG RAN WG1 Meeting #92, R1-1802908, Feb. 26-Mar. 2, 2018, Mar. 2, 2018 (Mar. 2, 2018), sections 2.2-2.3, 9, 14 pages.

ERICSSON: "Remaining Details of RACH Procedure," 3GPP TSG-RAN WG1 Meeting #93, R1-1806425, Busan, Korea, May 21-25, 2018, May 25, 2018, (May 25, 2018), the whole document, 10 pages.

International Search Report and Written Opinion—PCT/CN2021/072147—ISA/EPO—Oct. 20, 2021 10 Pages.

CATT: "Correction for UCI on Msg3 PUSCH", 3GPP TSG-RAN WG1 #102-e, R1-2005661, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, 4 Pages, XP052347034, Section 9.

Supplementary European Search Report—EP21918557—Search Authority—The Hague—Sep. 5, 2024.

Ericsson: "Random Access for MTC", 3GPP TSG RAN WG1 Meeting #83, R1-156420, Anaheim, USA, Nov. 15, 2015-Nov. 22, 2015, Nov. 7, 2015, pp. 1-10.

* cited by examiner

401
Scheduled
Entity
(e.g., UE)

403
Scheduling Entity
(e.g., Base Station)

400

402
SIB

404
Random access request (PRACH
preamble/MSG1)

406
Random access response (RAR/MSG2)

408
Initial MSG3 transmission

410
MSG3 Retransmission Request

412
MSG3 retransmission

414
MSG4

UPLINK CONTROL INFORMATION (UCI) MULTIPLEXED IN UPLINK MESSAGE WITH UPLINK MESSAGE REPETITION

This application is a national stage application under 35 U.S.C. § 371 of PCT Application No. PCT/CN2021/072147, filed Jan. 15, 2021. The entire contents of PCT Application No. PCT/CN2021/072147 is incorporated herein by reference in its entirety.

TECHNICAL FIELD

The technology discussed below relates generally to wireless communication systems, and more particularly, to random access procedures. Embodiments can provide and enable techniques for transmitting control information (e.g., uplink control information (UCI)) in random access procedures and improving reliability and coverage of uplink traffic transmissions (e.g., in random access procedures).

Introduction

In many wireless communication systems, a random access procedure provides a way for a mobile device to initiate a data transfer to a network. Often, a random access procedure is a contention-based procedure, where two or more such mobile devices that both wish to initiate their own data transfer contend for wireless resources. Sometimes, the random access procedures carried out by these competing devices can cause collisions in their transmissions, inhibiting the network from receiving from either one. Various random access procedures have been established for operation in the variety of wireless communication networks deployed today, with robust contention resolution procedures and reasonably good reliability.

Nevertheless, as the demand for mobile broadband access continues to increase, research and development continue to advance wireless communication technologies not only to meet the growing demand for mobile broadband access, but to advance and enhance the user experience with mobile communications. For example, a random access procedure having further improved reliability and coverage could improve user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects, the disclosure generally relates to transmitting uplink control information (UCI). In some scenarios, UCI may be used in random access procedures. UCI techniques discussed herein can be used for improving reliability (and preventing or mitigating latency) for physical uplink shared channels transmitted by a user equipment (and received by a base station). In some scenarios, UCI techniques discussed herein can additionally or alternatively utilize repetitions of an uplink (UL) message.

In some aspects of the disclosure, a UE may initiate a random access procedure with a base station. A UE may also, generate an uplink (UL) transmission message comprising a UL message and uplink control information (UCI) on a data region of a first slot, and transmit the UL transmission message as part of the random access procedure. A UE may further receive a retransmission request to retransmit the UL message, and transmit, in response to the received retransmission request, a UL retransmission message comprising the UL message and the UCI on the data region of the first slot.

In some aspects of the disclosure, a base station may receive, from a user equipment (UE), an uplink (UL) transmission message. The UL transmission can comprise a UL message and uplink control information (UCI) (e.g., on a data region of a first slot as part of a random access procedure). The base station may further transmit a retransmission request to receive the UL message. In response to the retransmission request, the base station may receive a UL retransmission message comprising the UL message and the UCI on the data region of the first slot as part of the random access procedure. For a repetition of the UL message, the base station may allocate a second slot. The base station may also transmit a scaling factor message to indicate a coding rate for the UCI.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/ purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
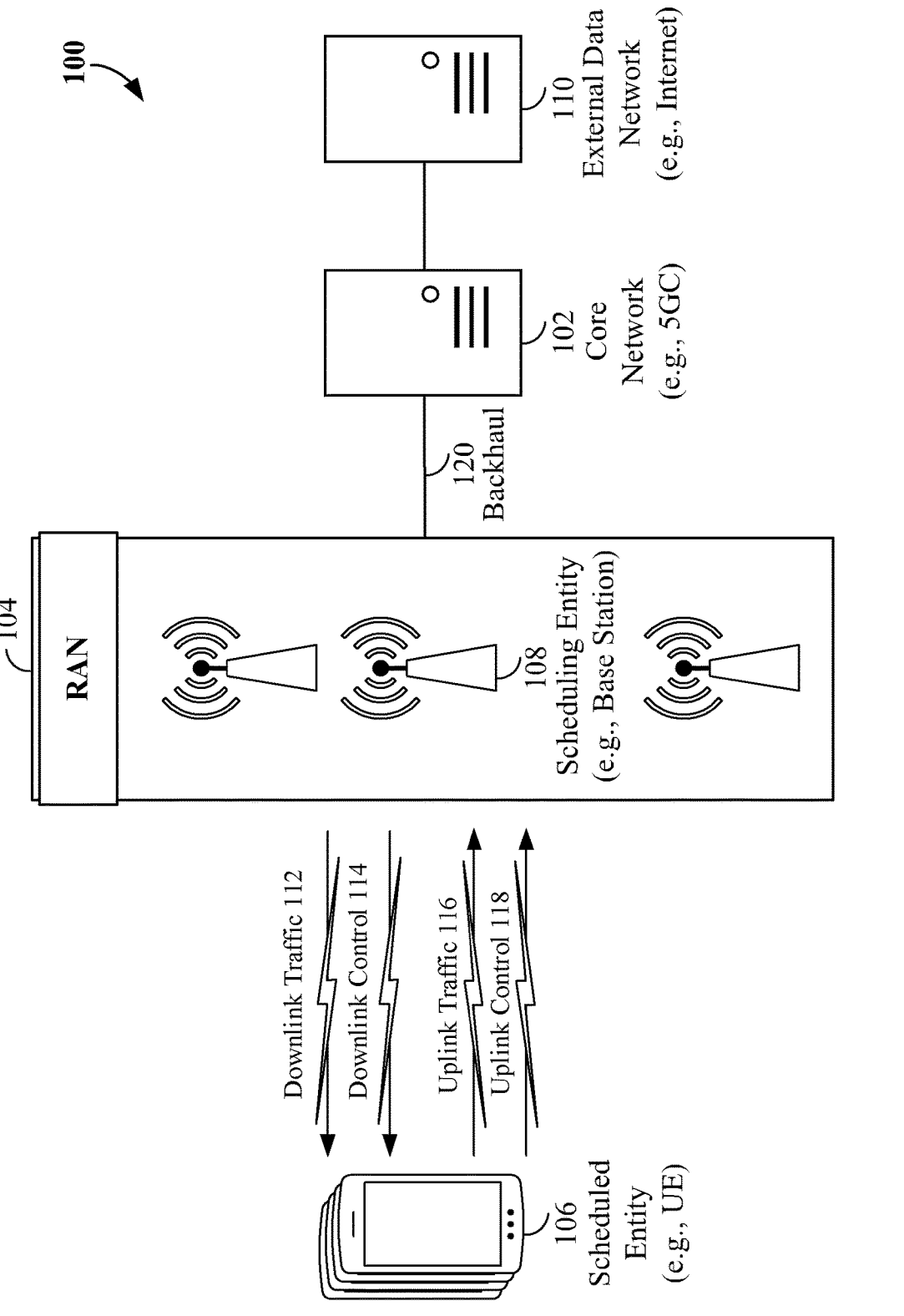
FIG. 1 is a schematic illustration of a wireless communication system according to some aspects.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 supports wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled. In scheduled operational scenarios, a scheduling entity (e.g., abase station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 can be a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
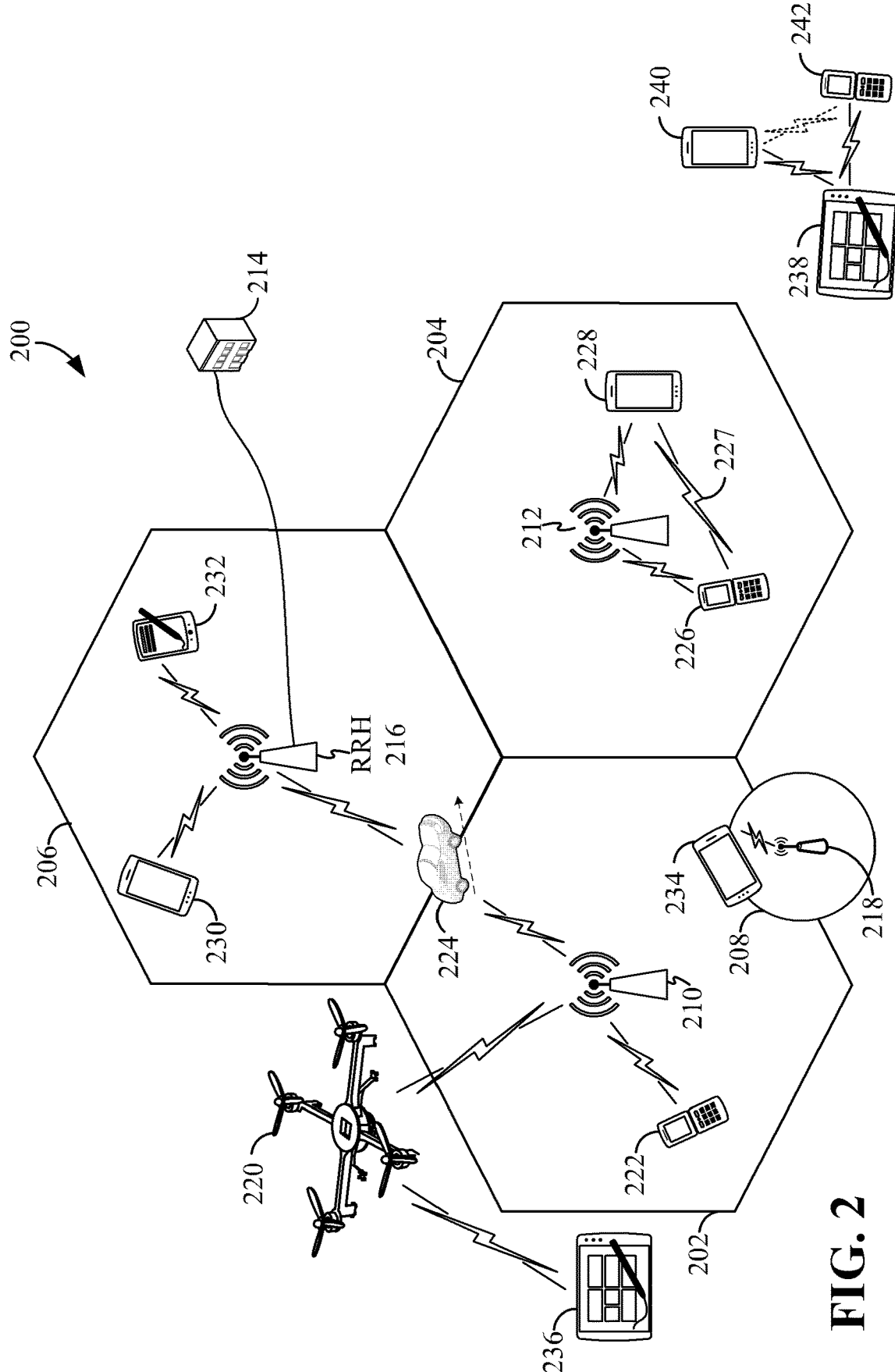
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may further utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a UE may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, a base station 210 may multiplex DL transmissions to UEs 222 and 224 utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may consist of a set of subframes (e.g., 10 subframes of 1 ms each). On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. As illustrated, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 404 may be available for communication. The resource grid 304 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the 3B 408 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
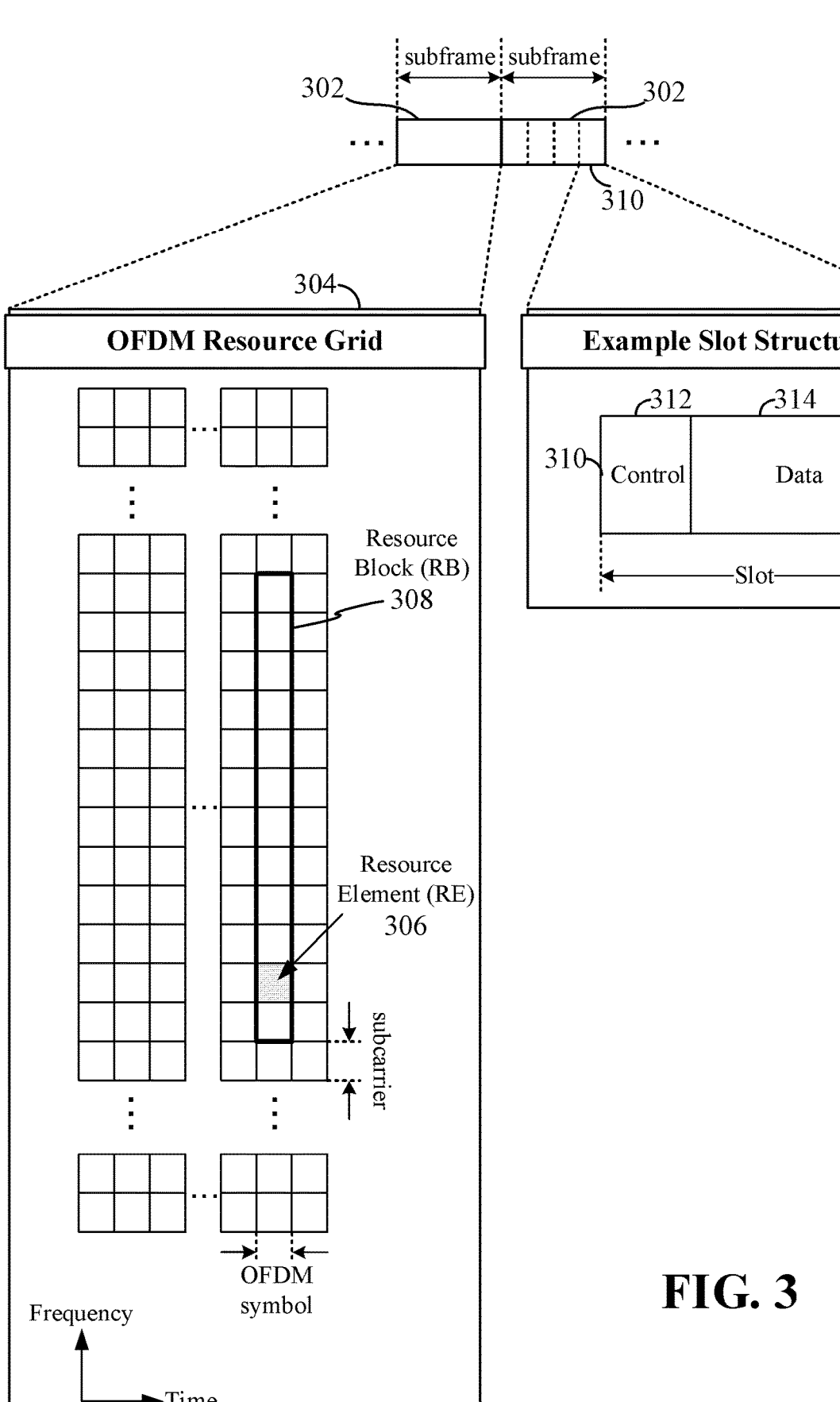
FIG. 3 is a schematic illustration of an organization of wireless resources in an air interface utilizing orthogonal frequency divisional multiplexing (OFDM) according to some embodiments.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 306 to carry UL control information 118 (UCI). The UCI can originate from higher layers via one or more UL control channels, such as a physical uplink control channel (PUCCH), a physical random access channel (PRACH), etc., to the scheduling entity 108. In addition, UCI may be carried by a physical uplink shared channel (PUSCH). Further, UL REs may carry UL physical signals that generally do not carry information originating from higher layers, such as demodulation reference signals (DM-RS), phase-tracking reference signals (PT-RS), sounding reference signals (SRS), etc. In some examples, the DMRS may be in use for, among others, estimating a channel. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UCI may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). Unlike PDSCH, a PUSCH may carry UL control information.

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information a UE requires for initial cell access, and for acquiring any OSI that may be broadcast periodically or sent on-demand. In some examples, a network may provide MSI over two different downlink channels. For example, the PBCH may carry a master information block (MIB), and the PDSCH may carry a system information block type 1 (SIB1). Here, the MIB may include a UE with parameters for monitoring a control resource set. The control resource set may thereby provide the UE with scheduling information corresponding to the PDSCH, e.g., a resource location of SIB1. In the art, SIB1 may be referred to as remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

In some examples, a physical layer may generally multiplex and map these physical channels described above to transport channels for handling at a medium access control (MAC) layer entity. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
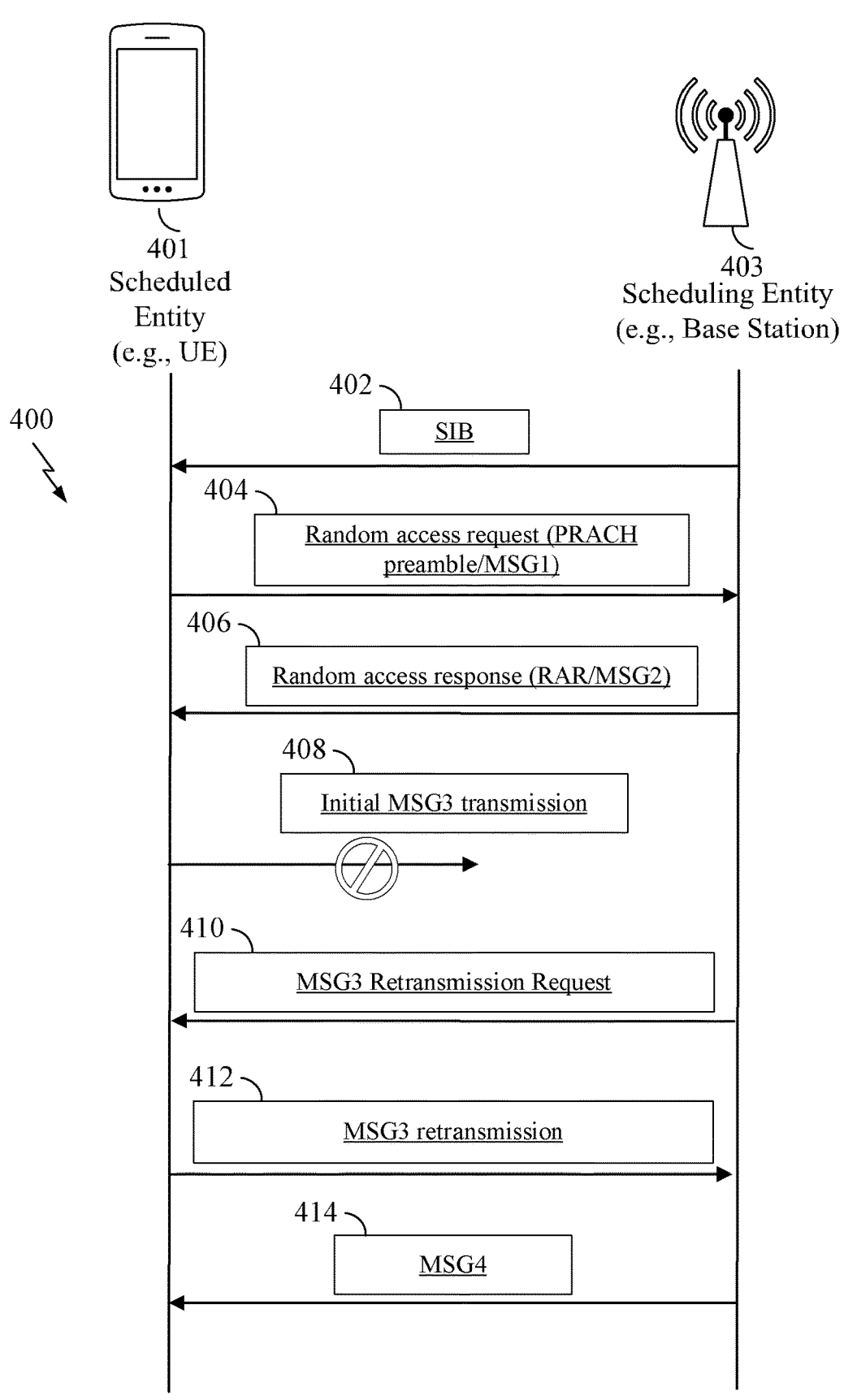
FIG. 4 is a call flow diagram illustrating a random access procedure according to some aspects.

FIG. 4 is a call flow diagram 400 of an exemplary random access procedure as described in 3GPP specifications for 5G NR. As shown, a scheduled entity 401, such as a UE, communicates with a scheduling entity 403, such as a base station or gNB. The description below will describe the scheduled entity 401 as a UE, and the scheduling entity 403 as a base station, although it can be appreciated that in other configurations other scheduled entities and scheduling entities could be substituted, as appropriate.

As illustrated, a UE 401 may receive system information (e.g., via a system information block, SIB) 402 from the base station 403. For example, the base station 403 may periodically broadcast the system information over a corresponding cell, and or the UE 401 may request an on-demand transmission of the system information. The SIB 402 can contain system information that includes cell access information that, when received by the UE 401, may enable the UE 401 to begin a random access procedure.

The UE 401 may transmit a RACH preamble 404 to the base station 403 over a physical random access channel (PRACH). This message 404 may equivalently be referred to as random access request or Message 1 (MSG1). If the base station 403 receives MSG1 404, the base station 403 can derive a random access-radio network temporary identifier (RA-RNTI) corresponding to the UE 401 (e.g., based on MSG1 404).

If the base station 403 properly receives and decodes the MSG1 transmission, then in response, the base station 403 may transmit a random access response 406 to the UE. For example, the base station 403 may transmit a PDCCH including a DCI with a CRC scrambled by the RA-RNTI, and a corresponding PDSCH including the RAR, equivalently referred to as Message 2 (MSG2).

Thus, after transmitting MSG1 404, the UE 401 may monitor for a random access response message 406 from the base station 403. That is, the UE 401 may monitor for a PDCCH including a DCI with a CRC scrambled by the RA-RNTI. However, if the base station 403 does not properly receive or decode the MSG1 transmission, then the base station 403 may not transmit such a response. Here, if the UE 401 does not receive its expected response, e.g., after a suitable timeout period, the UE 401 may retransmit MSG1 404 one or more subsequent times.

In the illustrated call flow 400, the UE 401 receives response 406 from the base station 403, including a PDCCH that carries a DCI with a CRC scrambled by the RA-RNTI; and a corresponding PDSCH carrying MSG2/RAR. Among other things, this random access response message 406 may provide the UE 401 with a grant or scheduling information indicating UL resources for the UE 401 to use for an UL transmission (e.g., for MSG3, described further below). Furthermore, this random access response message 406 may provide the UE 401 with a temporary cell-radio network temporary identifier (TC-RNTI), which the UE 401 may employ in subsequent phases of the random access procedure 400, described further below.

When the UE 401 receives the random access response 406, the UE may then transmit message 3 (MSG3) 408 of the random access procedure. Here, MSG3 may include any suitable information, and in some examples, may be located on a PUSCH. Here, the UE 401 may utilize resources corresponding to the UL grant received in the DCI in the RAR message 406.

After transmitting MSG3 408, the UE 401 may monitor for a PDCCH transmission as a response from the base station 403. Here, if the base station 403 correctly receives and decodes MSG3 408, the base station 403 may transmit message 4 (MSG4) of the corresponding random access procedure.

In some cases, such as the scenario illustrated in FIG. 4, the base station 403 may not correctly receive or decode MSG3 408. Here, such failure may be attributed to interference between similar signals (e.g., multiple UEs transmitting), inadequate transmission power for MSG3 by the UE 401, the UE 401 being a substantial distance away from the base station, etc. In some cases, base station 403 may determine, after a period of time of not properly receiving (and decoding) MSG3 408, to transmit the MSG3 retransmission request message 410. In other configurations, the base station 403 can determine whether to request the retransmission of MSG3, based on other parameters and conditions (e.g., the amount of the MSG3 properly decoded, etc.).

Accordingly, the base station 403 may transmit a request for UE retransmission of MSG3. In some configurations, the MSG3 retransmission request message 410 may include a PDCCH that carries a DCI with a CRC scrambled by the TC-RNTI indicated in the random access response message 406. In the MSG3 retransmission request message 410, the base station 403 may include a resource allocation or grant for time-frequency resources for the UE 401 to utilize for a corresponding MSG3 retransmission. In response to the MSG3 retransmission request message 410, the UE 401 may transmit a MSG3 retransmission 412.

This procedure may repeat multiple times, with the UE 401 sending multiple retransmissions of MSG3 if it does not receive the MSG4 transmission 414. In some existing networks, this issue may be somewhat frequent, due to unreliable MSG3 reception at a gNB. And when a UE employs multiple retransmissions of MSG3, this can result in an increased latency of the RACH procedure.

Multiplexing a Uplink Message with Uplink Control Information and/or its Repetitions According to an aspect of the present disclosure, a UE may transmit UCI to a base station. This can occur, in some scenarios, at an early call flow stage along with MSG3 by multiplexing the UCI with MSG3 on a physical uplink shared channel (PUSCH). In a further aspect of the present disclosure, to potentially even further improve MSG3 reliability and improve MSG3 coverage, a UE may employ MSG3 repetition (described further below). Repetition techniques can improve MSG3 reliability and extend MSG3 coverage in general or for a given cell. In some examples, a UE may employ MSG3 repetition (e.g., MSG3 with/without UCI) only for UE retransmission of MSG3; while in other examples, a UE may employ MSG3 repetition (e.g., MSG3 with/without UCI) for both an initial MSG3 transmission and for MSG3 retransmissions.

Figure 5:
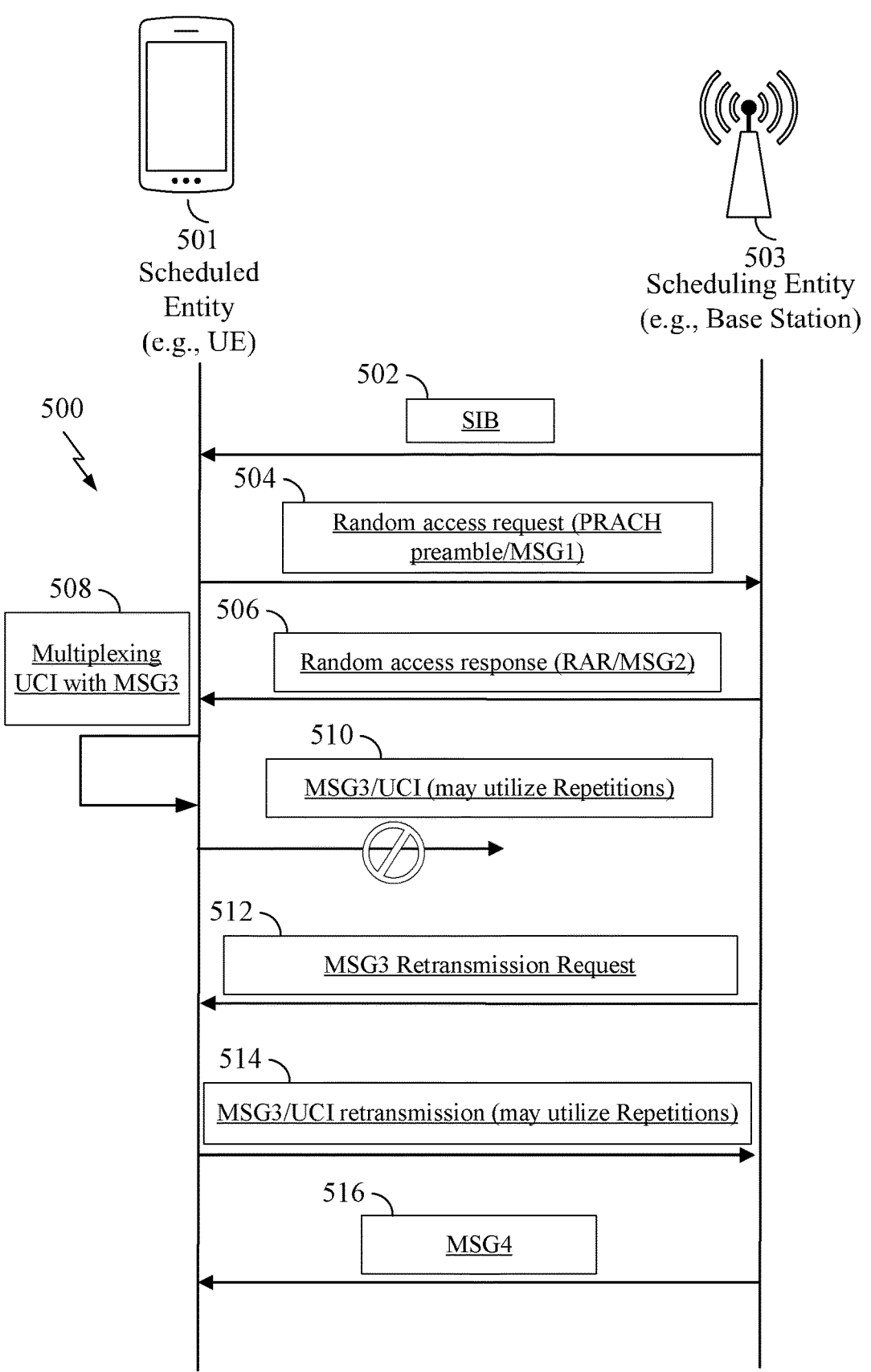
FIG. 5 is a call flow diagram illustrating a random access procedure multiplexing uplink control information (UCI) on a physical uplink shared channel (PUSCH) and employing message repetitions in accordance with some aspects.

FIG. 5 is a call flow diagram 500 of an exemplary random access process involving a UE 501 and a base station 503. As shown in the diagram 500, a UE 501 transmits or retransmits UCI and MSG3 (e.g, in a control transmission and/or on a PUSCH). Alternatively or additionally, the UE's 501 transmissions/re-transmissions may also employs MSG3 repetition(s) in some scenarios. According to some aspects, repetition may include repeated MSG3 and/or UCI transmissions. These transmissions may be transmitted on unique and/or corresponding PUSCH(s) according to some aspects of the present disclosure. Repetition rates may vary according to system design or as desired.

As illustrated, a UE 501 may receive system information (e.g., via a system information block, SIB) 502 from the base station 503. For example, the base station 503 may periodically broadcast system information (SI) over a corresponding cell, and/or the UE 501 may request an on-demand transmission of system information. System information may contain system information that includes cell access information that (e.g, when received by the UE 501, may enable the UE 501 to begin a random access procedure). In some aspects of this disclosure, the system information may further include a scaling factor message or beta factor to indicate a coding rate of UCI as described further below. For example, the UE 501 may determine a channel coding rate for UE's UCI based on the scaling factor message. In addition, or alternatively, a UE 501 may employ a scaling factor message or beta factor to determine resources for UCI in a given transmission. The determining of resources may include determining an amount or type of resources.

UE 501 can transmit random access attempts in varying manners. For example, the UE 501 may transmit a random access request, or RACH preamble 504 to the base station 503 over a physical random access channel (PRACH). This message 504 may equivalently be referred to as Message 1 (MSG1). If the base station 503 receives MSG1 504, the base station 503 can derive a random access-radio network temporary identifier (RA-RNTI) corresponding to the UE 501 (e.g., based on MSG1 504).

If the base station 503 properly receives and decodes the MSG1 transmission, then in response, the base station 503 may transmit a random access response (RAR) 506 to the UE. For example, the base station 503 may transmit a PDCCH including a DCI with a CRC scrambled by the RA-RNTI; a DCI for scheduling a corresponding PDSCH; and the corresponding PDSCH, including an RAR message, equivalently referred to as Message 2 (MSG2). In various examples, the DCI for scheduling the PDSCH carrying RAR message 506 may utilize DCI format 1_0.

Thus, after transmitting MSG1 504, the UE 501 may monitor for an RAR message 506 from the base station 503. That is, the UE 501 may monitor for a PDCCH including a DCI with a CRC scrambled by the RA-RNTI. However, if the base station 503 does not properly receive or decode the MSG1 transmission, then the base station 503 may not transmit such a response. Here, if the UE 501 does not receive its expected response, e.g., after a suitable timeout period, the UE 501 may retransmit MSG1 504 one or more subsequent times.

In the illustrated call flow 500, the UE 501 receives an RAR message 506 from the base station 503. Here, the RAR message 506 may include a PDCCH that carries a DCI with a CRC scrambled by the RA-RNTI. Among other things, this RAR message 506 may provide the UE 501 with a grant or scheduling information indicating UL resources for the UE 501 to use for an UL transmission (e.g., for MSG3). Furthermore, this RAR message 506 may provide the UE 501 with a TC-RNTI, which the UE 501 may employ in subsequent phases of the random access procedure 500, described further below.

When the UE 501 receives the RAR message 506, the UE 501 may utilize resources corresponding to the UL grant received in the DCI in the RAR message 506. Here, the UE 501 may multiplex UCI and message 3 (MSG3) of the random access procedure on a PUSCH 508, described further below in connection with FIG. 6. That is, the UE 501 may map the UCI and MSG 3 on a data region of an allocated slot. In in some examples, the multiplexed UCI with MSG3 may be located on a PUSCH. Thus, the UE 501 may then transmit the multiplexed UCI with MSG3 510 using the PUSCH. Both Discrete Fourier Transform spread Orthogonal Frequency Division Multiplexing (DFT-s-OFDM) and Cyclic Prefix OFDM (CP-OFDM) waveforms may support the UCI multiplexing on a PUSCH. Here, the UCI may include at least one of hybrid automatic repeat request acknowledgement (HARQ-ACK), channel state information (CSI), or scheduling request (SR). In some examples, the UCI may also include information to support MSG3 repetition, described further below. The information included in the UCI to support MSG3 repetition may include, but is not limited to, a UE capability indication for indicating UE support of a UL message repetition feature, a UE capability indication for indicating UE support of PUSCH repetition type A feature by counting a number of repetitions based on available UL slots, or a UE capability indication for indicating UE support of a PUSCH demodulation reference signal (DMRS) bundling feature for the repetition of the UL message. MSG3 may include any suitable information including, but not limited to, a radio resource control (RRC) setup request, a RRC resume request, or an RRC reconfiguration complete indication.

In some examples, in order to map the UCI on a data region of a slot, the UE 501 may determine an amount or type of resources or the number of resource elements for the UCI. The determination may be based on the payload size of the UCI, the coding rate of the PUSCH, and a scaling factor message/beta factor. The UE 501 may receive the scaling factor message or beta factor from the base station 503. The scaling factor message may be dynamically indicated in the DCI or semi-statically configured by an RRC message using 2 bits. In some examples, the DCI in association with the RAR message 506 from the base station 503 may include one or more bits (e.g., reserved bits in existing specifications) configured to indicate the scaling factor message. The one or more bits configured to indicate the scaling factor message may include one or more reused bits from a set of reserved bits in a DCI format 1_0 with a CRC scrambled by a RA-RNTI. In particular, a DCI of format 1_0 may include a set of 14 or 16 reserved bits, in different configurations, according to existing specifications. Thus, a base station 503 may employ a set of one or more of these otherwise reserved bits as repurposed bits to provide the UE 501 with a scaling factor message. In addition, the UE 501 may receive the scaling factor message in at least one of the system information, the RAR message 506, or any other suitable message from the base station. The UE 501, then, may be able to map the UCI on a data region of a slot. In addition, the UE 501 may map MSG3 on the data region of the slot as well. Then, the UE 501 may transmit the multiplexed UCI with MSG3 510 using the data region of the slot or a PUSCH to the base station 503.

In a further aspect of the present disclosure, a RACH procedure may support MSG3 repetition for an initial UL transmission message (e.g., MSG3). That is, the initial UL transmission message may include multiple MSG3s, and the UE 501 may transmit the multiple MSG3s 510 at the same time. Here, each of repetitions of MSG3 may include MSG3 alone or MSG3 with the UCI on a data region of a different and respective slot. Thus, the initial MSG3 transmission may include multiple MSG3s with or without UCI. The base station 503 may determine whether the UCI is included in a set of the repetitions by allocating resources for UCI in a respective repetition. Thus, to support MSG3 repetition, the base station 503 may allocate resources for MSG3 repetition through a UL grant received in the DCI from the RAR message 506 or any other suitable message from the base station 503. The UE 501 may utilize DCI format 0_0 for scheduling corresponding PUSCH(s) for MSG3 repetition. The RAR message 506 may carry the DCI with a CRC scrambled by a TC-RNTI for scheduling uplink resources for MSG3 repetition.

Multiple PUSCH repetition types may exist. These may be include a first and second type (sometimes referred to as Type B and Type B). Type A uses the same symbol allocation in each slot applied across repeated PUSCH transmissions while Type B employs a different symbol allocation in slots applied across repeated PUSCH transmissions. That is, in Type A, the starting symbol S relative to the start of the slot, and the number of consecutive symbols L counting from the symbol S allocated for the PUSCH are determined from the start and length indicator SLIV of the indexed row. Here, in Type A, MSG3 may be allocated on the same portion and location of each slot while in Type B, MSG3 may not. In Type A, the UE 501 may determine the number of repetitions based on available or allocated UL slots. The base station 503 may also directly inform the number of repetitions to the UE 501 through various ways including the RAR message 506, an RRC message, and any other suitable message as well. Thus, the UE 501 may multiplex the UCI with MSG3 on a data region of a slot; multiplex each of one or more MSG3s with/without UCI on a data region of a respective and different slot for MSG3 repetition; and transmit the multiplexed UCI with MSG3 and one or more MSG3s with/without UCI at the same time. In some examples, the UE 501 may employ repetition for the initial UL transmission message 510, as described herein. In other examples, however, the UE 501 may not implement repetition for the initial UL transmission message 510 and may transmit an initial MSG3 transmission without repetition.

After transmitting MSG3 with UCI 510 with or without MSG3 repetition, the UE 501 may monitor for a PDCCH transmission from the base station 503. Here, if the base station 503 correctly receives and decodes MSG3 with UCI 510, the base station 503 may transmit message 4 (MSG4) of the corresponding random access procedure.

In some cases, the base station 503 may not correctly receive or decode MSG3 510. In some cases, the base station 503 may determine, after a period of time of not properly receiving (and decoding) MSG3 510, to transmit the MSG3 retransmission request message 512. In other configurations, the base station 503 can determine whether to request the retransmission of MSG3, based on other parameters and conditions (e.g., the amount of the MSG3 properly decoded, etc.).

Accordingly, the base station 503 may transmit a request for UE retransmission of MSG3 512. In some configurations, the MSG3 retransmission request message 512 may include a PDCCH that carries a DCI with a CRC scrambled by a TC-RNTI. For example, the DCI in the MSG3 retransmission request message 512 may utilize DCI format 0_0. DCI format 0_0 may include (among other things) the following information: 1 (reserved) bit identified as a New Data Indicator and 4 (reserved) bits identified as a HARQ process number. The UE 501 may employ the reserved bits as repurposed bits or reuse reserved bits without specific purposes in subsequent phases of the random access procedure 500, described further below. Further, the MSG3 retransmission request message 512 may provide the UE 510 with the same grant or scheduling information as the information the UE 501 uses for the initial UL transmission message (e.g., for MSG3 with/without UCI 510). However, the MSG3 retransmission request message 512 may provide the UE 510 with a different grant or scheduling information from the information the UE 501 uses for the initial UL transmission message (e.g., for MSG3 with/without UCI 510). Although the UE 501 may exploit previously allocated resources, the base station 503 may change the configuration for MSG3 repetition in retransmission. For example, the initial UL transmission message (e.g., for MSG3 with UCI 510) may not include any MSG3 repetition while the UL retransmission message 514 may employ MSG3 repetition. Then, the base station 503 may allocate resources for the MSG3 repetition. Further, the initial UL transmission message 510 may already include repetitions of MSG3. However, the UL retransmission message 514 may exploit a different number of repetitions of MSG3 from that of the initial UL transmission message 510. In addition, the UL retransmission message 514 may employ a different number of slots to multiplex UCI with MSG3 on their data regions. Then, the base station 503 may change the resource allocation scheme for the UL retransmission message 514 on a PUSCH.

In some cases, the UE 501 may not correctly receive or decode the MSG3 retransmission request message 512. In some cases, the UE 501 may determine, after a period of time of not properly receiving (and decoding) the MSG3 retransmission request message 512, to transmit the UL retransmission message 514. In other configurations, the UE 501 can determine whether to retransmit the initial UL transmission message 510, based on other parameters and conditions (e.g., the amount of the MSG3 retransmission request message properly decoded, etc.). In that case, the UE 501 may retransmit the initial UL transmission message 510 using resources that are already allocated on corresponding PUSCH(s).

In other cases, the UE 501 may receive the MSG3 retransmission request message 512. After receiving the MSG3 retransmission request message 512, the UE 501 may merely retransmit the initial UL transmission message including MSG3 multiplexed with UCI on the data region of the slot already allocated. In other cases, the UE 501 may utilize resources corresponding to a UL grant received in the DCI in the MSG3 retransmission request message 512. That is, the base station 503 may reallocate resources for MSG3 and UCI on a data region of a slot because of different conditions and parameters (e.g., coding rate change for the UCI, UCI contents change, etc.).

For example, the UE 501 may map the UCI and MSG3 on a data region of a newly allocated slot. In the UL retransmission 514, the UE 501 may transmit the multiplexed UCI with MSG3 510 using the newly allocated slot or PUSCH. Here, the UCI may include at least one of hybrid automatic repeat request acknowledgement (HARQ-ACK), channel state information (CSI), or scheduling request (SR). In some examples, the UCI may also include information to support MSG3 repetition as described above. In some examples, in order to map the UCI on a data region of a slot in the UL retransmission message 514, the UE 501 may redetermine the amount of resources or the number of resource elements for the UCI. The determination may be based on the payload size of the UCI, the coding rate of the PUSCH, and a scaling factor message/beta factor. The amount of resources for the UCI in the UL retransmission message may be different from that for the UCI in the initial UL transmission message 510. The UE 501 may receive the scaling factor message or beta factor from the base station 503. The scaling factor message may be indicated in the DCI or semi-statically configured by an RRC message using 2 bits. For example, the DCI in MSG3 retransmission request message 512 may include one or more bits configured to indicate the scaling factor message. The one or more bits configured to indicate the scaling factor message may include at least one of: one or more reserved bits from a first set of reserved bits or a second set of repurposed reserved fields in a DCI format 0_0 with a CRC scrambled by a TC-RNTI. In particular, the DCI format 0_0 may include 1-bit New Data Indicator and/or 4-bit HARQ Process Number. The New Data Indicator and/or the HARQ Process Number may be used as repurposed bits or fields for a scaling factor message. However, the UE 501 may employ a set of one or more of other reserved bits to provide the UE 501 with a scaling factor message. Further, the UE 501 may receive a scaling factor message in the system information, the RAR message 506, or any other suitable message from the base station 503. The UE 501, then, may map the UCI on a data region of the newly allocated slot. In addition, the UE 501 may map MSG3 on the data region of the slot as well. Thus, the UE 501 may transmit the multiplexed UCI with MSG3 510 using the data region of the slot in the UL retransmission message 510 to the base station 503.

In a further aspect of the present disclosure, a RACH procedure may support MSG3 repetition for an UL retransmission. That is, the UL retransmission message 514 may include multiple MSG3s, and the UE may transmit the multiple MSG3s 514 at the same time. Here, each of repetitions of MSG3 may include MSG3 alone or MSG3 with the UCI on a data region of a different and respective slot. In the UL retransmission message 514, repetitions of MSG3 may be additional to the initial UL transmission message 510 on already allocated slots or PUSCHs. The base station 503 may determine whether the UCI is included in each of the repetitions of MSG3 by allocating resources for UCI in a respective repetition. Thus, to support MSG3 repetition, the base station 503 may allocate resources for MSG3 repetition through the UL grant received in the DCI. The UL retransmission message 514 may include the initial UL transmission message 510 with additional repetitions of MSG3 with/without UCI. The UE 501 may utilize DCI format 0_0 for scheduling a corresponding PUSCH for MSG3 repetition. The MSG3 retransmission request 512 may carry the DCI with a CRC scrambled by the TC-RNTI.

Two PUSCH repetition types may exist as described above. In type A, the UE 501 may determine the number of repetitions based on available or allocated UL slots in the UL retransmission message 514. However, the base station 503 may directly inform the number of repetitions to the UE 501 through various ways including any other separate and suitable message. Thus, the UE 501 may reuse the initial UL transmission message 510; add additional repetitions of MSG3 with/without UCI on data regions of slots; and transmit, as the UL retransmission message, the initial UL transmission message and the additional repetitions at the same time. In other cases, the UE 510 may multiplex MSG3 with UCI on a data region of a newly allocated slot; multiplex each of one or more MSG3s with/without UCI on a data region of a respective different slot; and transmit the multiplexed UCI with MSG3 and one or more MSG3s with/without UCI at the same time.

The repetition procedure may repeat multiple times, with the UE 501 sending multiple retransmissions of MSG3 if it does not receive the MSG4 transmission 516. In the illustrated example, the base station 503 transmits a MSG4 transmission 516 after properly receiving and decoding the UL retransmission message 514.

Figure 6:
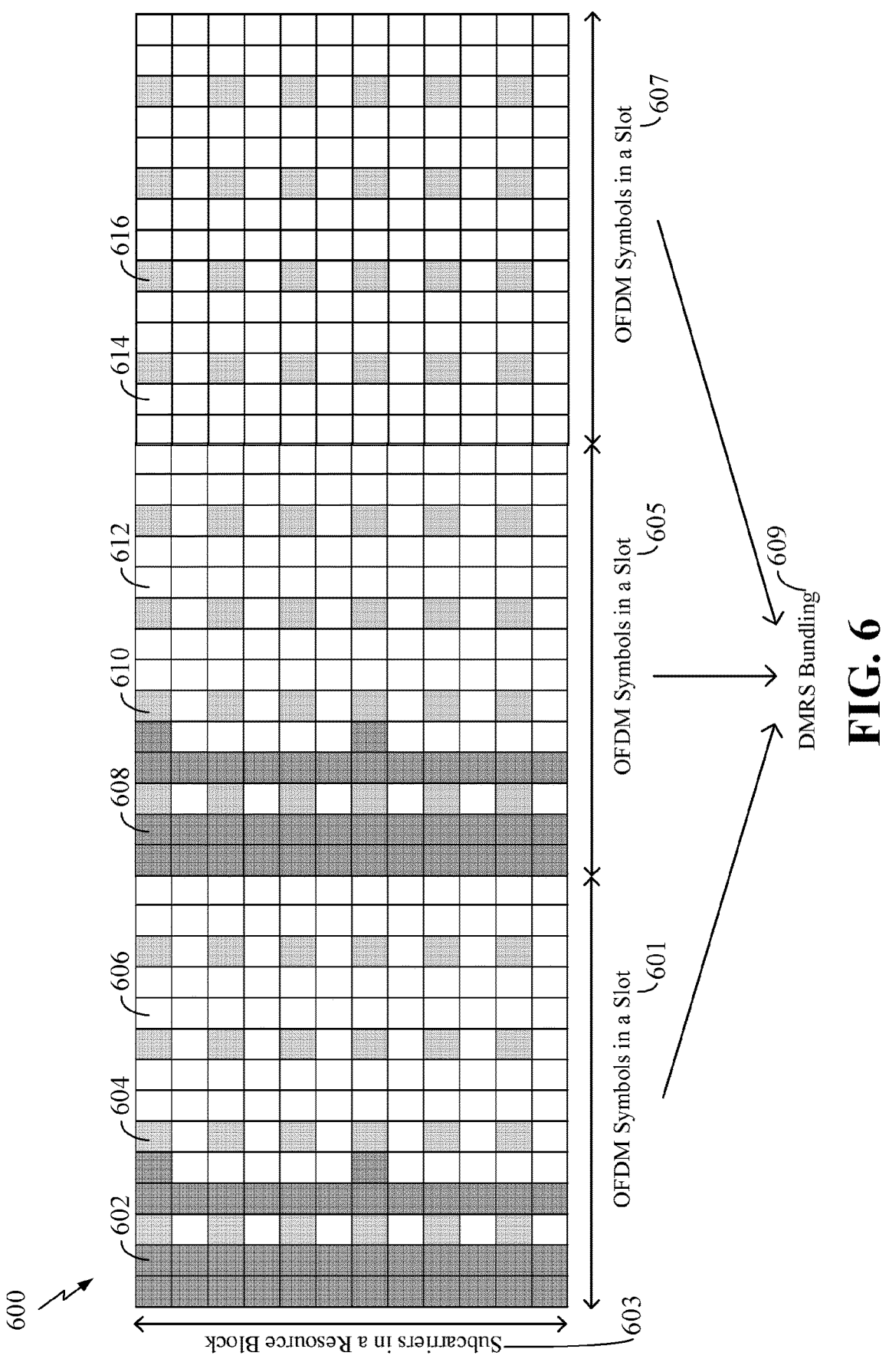
FIG. 6 is a schematic illustration of multiplexed UCI with a message on a data region of a slot and repetitions of the message with or without UCI in an uplink transmission (or retransmission) according to some aspects of the disclosure.

FIG. 6 shows a conceptual illustration of multiplexing MSG3 606 with UCI 602 on a PUSCH and MSG3 repetition. FIG. 6 shows an exemplary OFDM resource grid 600 in data regions of slots. Here, time is in the horizontal direction with units of OFDM symbols; and frequency is in the vertical direction with units of subcarriers. Thus, the resource grid 600 is divided into multiple resource elements (REs) 602, 604, 606. An RE is 1 subcarrier×1 symbol. In this example, a block of REs, which is a resource block (RB) 603 includes 12 subcarriers. In some examples, depending on the numerology, an RB may contain any suitable number of consecutive subcarriers in the frequency domain and any suitable number of consecutive OFDM symbols in the time domain. In addition, in this example, a data region of a slot contains 14 OFDM symbols. However, depending on the numerology, a slot may contain any suitable number of OFDM symbols.

On the data region of a slot, UCI 602 and MSG3 605 may be multiplexed. The UCI 602 may include a HARQ-ACK, CSI, and a SR. The UCI 602 may also include information to support MSG 3 repetition (e.g., a UE capability indication for indicating UE support of a UL message repetition feature, a UE capability indication for indicating UE support of PUSCH repetition type A feature by counting a number of repetitions based on available UL slots, and/or a UE capability indication for indicating UE support of a PUSCH DMRS bundling feature for the repetition of the UL message). The UCI 602 may be encoded and multiplexed with uplink-shared channel (UL-SCH) data including MSG3 606 in some examples, and be transmitted on a PUSCH. The UCI 602 may be mapped to all layers of the transport block on a PUSCH. Thus, the number of layers of the UCI 602 is the same as the number of layers of the PUSCH. Modulation order of the UCI 602 may follow the modulation order of the UL-SCH.

Here, the UE may map the UCI 602 on a data region of a slot 601, which is not in OFDM symbols for DMRS 604. The mapping of the UCI may be on contiguous REs or distributed across available REs on the slot. The UCI 602 to be mapped may include at least one of: a HARQ-ACK, CSI, a SR, or information for MSG3 repetition. To map the UCI 602 on the slot 601, the UE may determine the number of REs for the UCI 602. The determination may be based at least on a scaling factor message. The UE may receive the scaling factor message from the base station in at least one of: system information, a RAR message, DCI, RRC, or any other message from the base station. In particular, a scaling factor message may be indicated in one or more reused bits from a set of reserved bits in a DCI format 1_0 with a CRC scrambled by a RA-RNTI. Further, a scaling factor message may also be indicated in one or more reserved bits from a set of reserved bits or another set of repurposed reserved fields in a DCI format 0_0 with a CRC scrambled by a TC-RNTI. The repurposed reserved fields may correspond to one or both of a New Data Indicator field or a HARQ process number field.

The UE may map UL-SCH data 606 on available REs on the slot 601. In some examples, the UL-SCH data 606 may include MSG3 of a random access procedure. The order to map the UCI 602 and MSG3 on a data region of a slot 601 above should be appreciated as a mere example. The order for the mapping may be different from the above example. For example, the UE may map MSG3 606 first and map the UCI 602 on available REs in the slot 601. Then, the UE may transmit encoded UCI and MSG3 on a PUSCH.

In a further aspect of the present disclosure, FIG. 6 may also show MSG3 repetition for an initial UL transmission message and/or UL retransmission message(s). Each of the repeated MSG3s 605, 607 may use the same arrangement of REs on a respective slot for MSG3 repetition as those on the first slot 601 which is the subject to be repeated (type A repetition) or use a different arrangement of REs on a respective slot for MSG3 repetition (type B repetition). The base station may determine whether the UE employs MSG3 repetition only for the initial UL transmission message, only for UL retransmission message(s), or both for the initial UL transmission message and UL retransmission message(s). The base station may determine whether the UE multiplex the UCI only for UL retransmission message(s), or both for the initial UL transmission message and UL retransmission message(s). Further, the base station may determine the number of MSG3 repetitions in the initial UL transmission message and the UL retransmission message(s). In addition, the base station may determine whether the UE multiplex the UCI on one repetition of MSG3 (e.g., the first repetition) or multiple repetitions of MSG3 (e.g., UCI repeated in multiple MSG3 repetitions on corresponding slots). Thus, each of repetitions of MSG3 may include MSG3 alone or MSG3 with the UCI on a data region of a different slot.

For example, the UE may multiplex MSG3 606 and the UCI 602 on the data region 601 of the first slot in the initial UL transmission message and/or the UL retransmission message(s). However, the UE may or may not multiplex the UCI 602 on data region(s) 605, 607 of subsequent slot(s) for MSG3 repetition in the initial UL transmission message and/or the UL retransmission message(s). For instance, the UE may multiplex MSG3 612 with the UCI 608 on the data region 605 of the first repetition slot for MSG3 repetition (which is a subsequent slot to the first slot for a given transmission) while the UE may not multiplex MSG3 614 with the UCI 608 on the data region 607 of the subsequent repetition slots for MSG3 repetition (which are not the first slot and the first repetition slot for a given transmission). However, it should be appreciated that the UCI multiplexing on the data region of repetition slots is not limited to the example above. The UE may multiplex the UCI on the data region of some other repetition slot(s) or all repetition slots for MSG3 repetition. In addition, the first slot and subsequent slot(s) for MSG3 repetition may be contiguous or distributed in allocated resources.

In some examples, a UE may use a PUSCH DMRS bundling feature for MSG3 repetition. The UE may use DMRS symbols within a slot (or a mini-slot) for channel estimation for data demodulation. However, the UE may jointly process DMRS symbols in multiple slots to improve the channel estimation accuracy. To this end, the UE may need to coherently transmit DMRS symbols over multiple slots/repetitions, i.e., the UE should maintain phase continuity across DMRS symbols in different slots/repetitions. This technique may refer to as DMRS bundling. In the example at FIG. 6, there are one first original UL transmission slot 601 and two subsequent repetition slots 605, 607. The UE may calculate an average or an aggregate of the energy of DMRS in the three slots 601, 605, 607 in a given UL transmission (e.g., the initial UL transmission message or the UL retransmission message(s)). The DMRS bundling on three slots 601, 605, 607 may estimate the PUSCHs on which multiplexed MSG3s 606, 612, 614 with/without UCI 602, 608 are transmitted.

Figure 7:
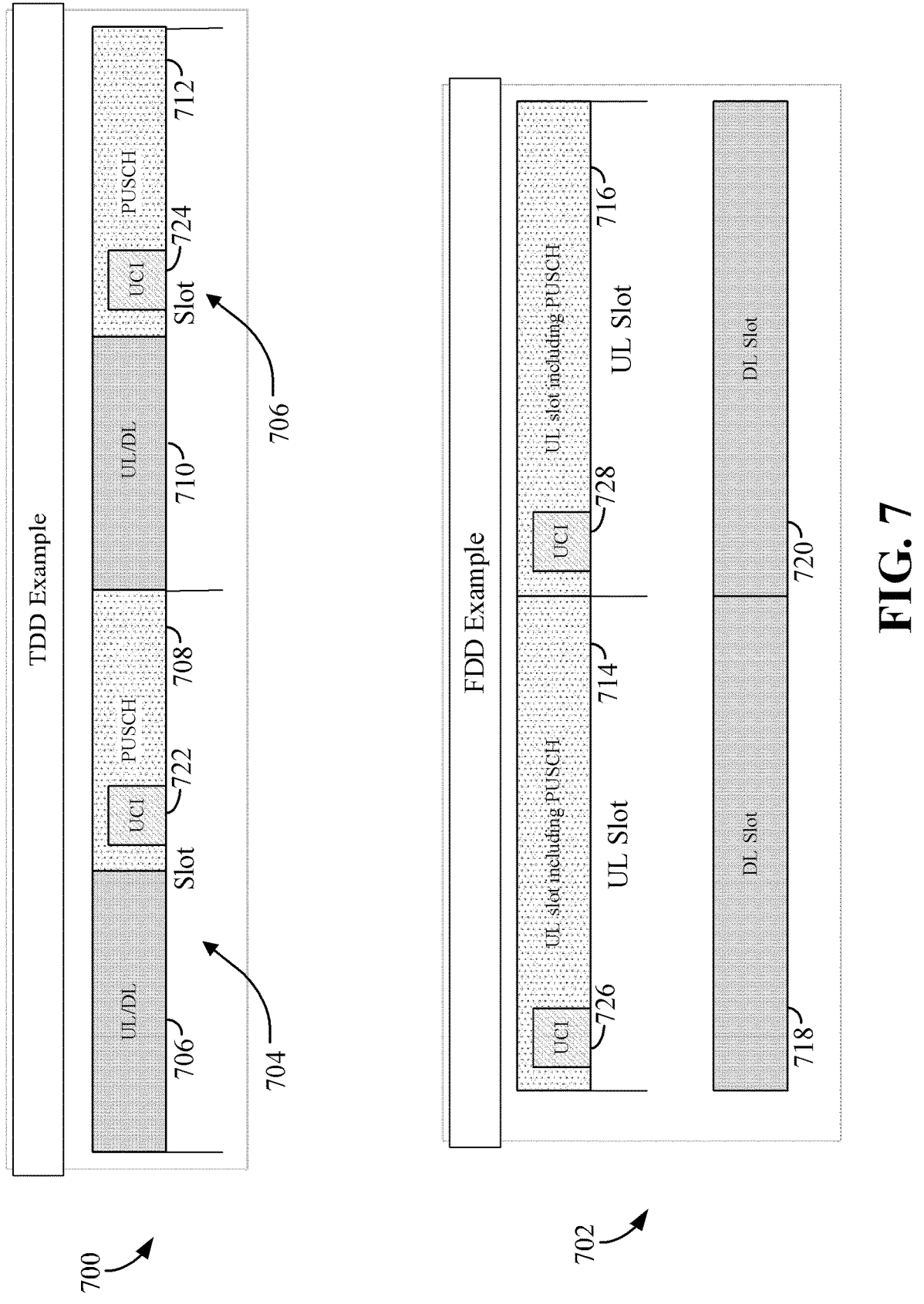
FIG. 7 is a conceptual illustration of frequency division duplex (FDD) and time division duplex (TDD) examples having an uplink transmission (or retransmission) including multiple repetitions of a message with UCI according to some aspects of the disclosure.

FIG. 7 shows a conceptual illustration of a transmission (e.g., a MSG3 transmission) that includes multiplexing UCI on a data region of a slot and one or more repetitions of a given packet or message. For example, a first example 700 shows such a transmission on a time division duplex (TDD) carrier. A second example 702 shows such a transmission on a frequency division duplex (FDD) carrier. As described further below, a UE may transmit a multiplexed message with UCI and one or more repetitions of the message on a PUSCH in multiple corresponding slots.

In example 700, two slots labeled 704 and 706 are shown on the TDD carrier. The first slot 704 includes a first region 706 (which can include uplink, downlink, or a suitable combination of these), and an uplink burst region 708. The uplink burst region 708 may include a PUSCH on which a given UE has a resource assignment or grant for an uplink transmission. The UE may have a separate resource assignment or grant for UCI 722 in the data region 722, 708 of the slot 704. The UE may multiplex a message 708 and the UCI 722 on a PUSCH. In some examples, the message 708 may be MSG3 of a random access procedure. As illustrated, a second slot 706 has a similar format, including a first region 710 and an uplink burst region 712. The second slot 706 may be a slot for message repetition. That is, the message 708 in the first slot 704 may be the same as the message 706 in the second slot 706. In a repetition slot 706, the UE may or may not multiplex the UCI on a respective PUSCH 712. According to an aspect of the present disclosure, a UE may transmit one or more repetitions of a given packet or message on PUSCHs in respective slots based on a message from the base station. Although the slots 704, 706 are illustrated as being contiguous, in other examples these slots may not be contiguous. That is, a gap of one or more slots may appear between repetitions of a transmitted message as described herein. Additionally, although only two slots 704, 706 for the example 700 are illustrated, in other examples, the UE can transmit any suitable number of repetitions across a set of slots.

In example 702, the uplink component carrier of the FDD carrier includes two uplink slots 714 and 716, and the downlink component carrier includes two downlink slots 718 and, 720. The first uplink slot 714 may include a PUSCH on which a given UE has a resource assignment or grant for an uplink transmission. The UE may have a separate resource assignment or grant for UCI 722 in the data region 714, 726 of the first uplink slot 714. The UE may multiplex a message 714 and the UCI 726 on a PUSCH 714, 726. In some examples, the message 708 may be MSG3 of a random access procedure. According to an aspect of the present disclosure, a UE may transmit multiple repetitions of a given packet or message on PUSCHs in respective uplink slots. The second uplink slot 716 may be a slot for message repetition. That is, the message 716 in the second uplink slot 704 may be the same as the message 706 in the first uplink slot 714. In a repetition slot 716, the UE may or may not multiplex the UCI on a respective PUSCH 716. Similar to the example 500, in example 502, although the uplink slots 514, 516 are illustrated as being contiguous, in other examples these UL slots may not be contiguous. That is, a gap of one or more slots may appear between repetitions of a transmitted message as described herein. Additionally, although only two uplink slots 514, 516 for the example 502 are illustrated, in other examples, the UE can transmit any suitable number of repetitions.

Figure 8:
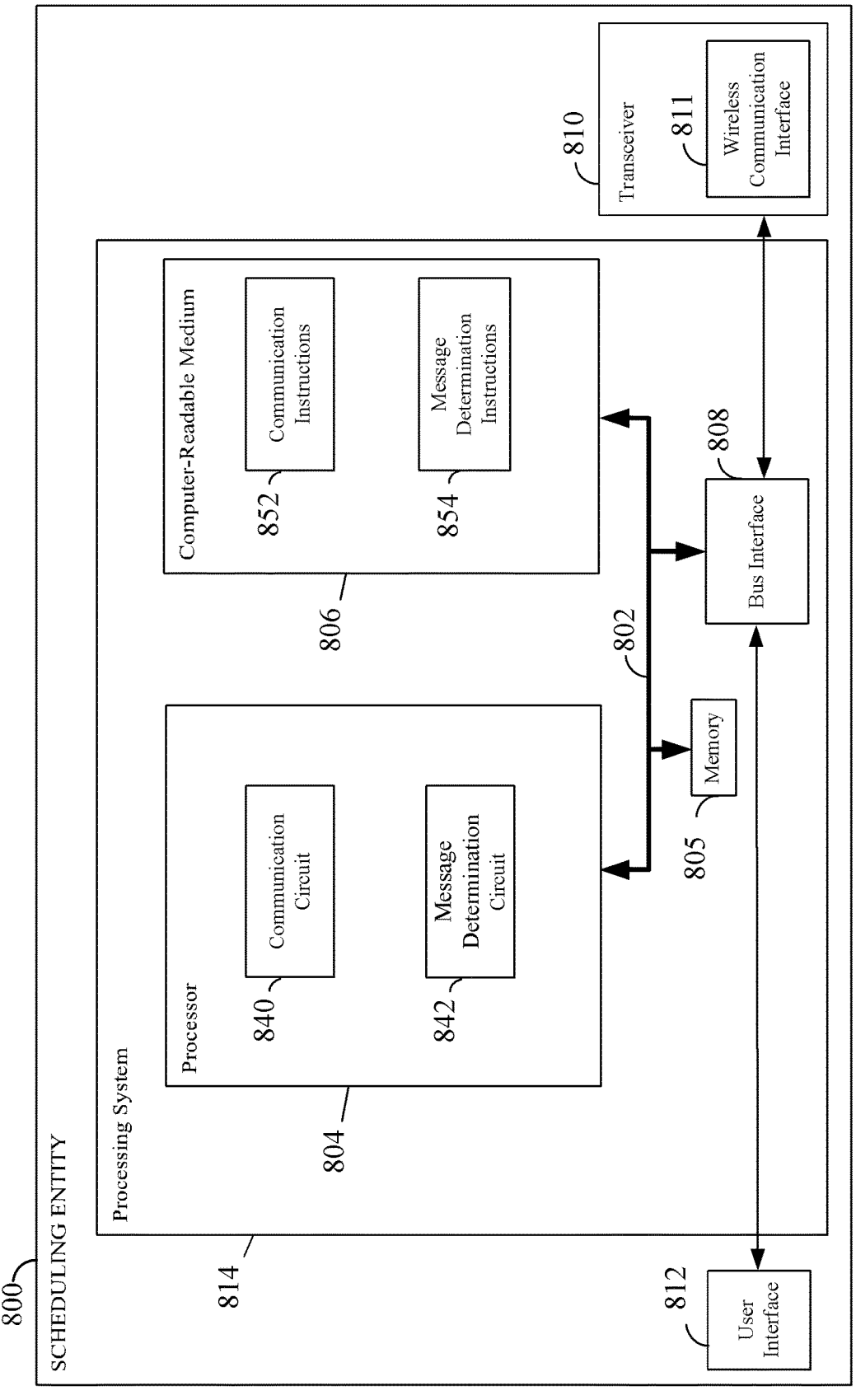
FIG. 8 is a block diagram conceptually illustrating an example of a hardware implementation for a scheduling entity according to some aspects of the disclosure.

FIG. 8 is a block diagram illustrating an example of a hardware implementation for a scheduling entity 800 employing a processing system 814. For example, the scheduling entity 800 may be a user equipment (UE) as illustrated in any one or more of FIGS. 1, 2, 4, 5, and/or 10. In another example, the scheduling entity 800 may be a gNB, a base station, or other transmission reception point (TRP) as illustrated in any one or more of FIGS. 1, 2, 4, 5, and/or 10.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be configured (e.g., in coordination with the memory 805) to implement any one or more of the processes and procedures described below and illustrated in FIGS. 5 and/or 10.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. For example, the transceiver 810 may include a wireless communication interface 811 configured for wireless transmission and/or reception over a radio access network. Depending upon the nature of the network node, a user interface 812 (e.g., keypad, display, speaker, microphone, joystick) may also be provided. Of course, such a user interface 812 is optional, and may be omitted in some examples, such as a base station.

In some aspects of the disclosure, the processor 804 may include communication circuitry 840 configured (e.g., in coordination with the memory 805) for various functions, including, for example, configuring and/or transmitting on a downlink traffic channel and/or downlink control channel. Additionally, communication circuitry 840 can be configured for transmitting system information (including cell access information), such as in a system information block (SIB). For example, the communication circuitry 840 may be configured to implement one or more of the functions described below in relation to FIGS. 9 and/or 10. The processor 804 may further include message determination circuitry 842, which can determine whether the scheduling entity 800 correctly receives an uplink message (message 3 of a random access procedure) from a scheduled entity.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the computer-readable storage medium 806 may store computer-executable code that includes communication instructions 852 that configure a scheduling entity 800 for various functions, including, e.g., configuring and/or transmitting on a downlink traffic channel and/or downlink control channel, receiving on an uplink traffic channel and/or uplink control channel. Additionally, communication instructions 852 can be configured for transmitting system information (including cell access information), such as in a system information block (SIB).

In one configuration, the scheduling entity 800 includes means for transmitting on a downlink traffic channel and/or downlink control channel, means for receiving on an uplink traffic channel and/or uplink control channel, and/or means for determining whether the uplink message is correctly received. In one aspect, the aforementioned means may be the processor(s) 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1, 2, 4, 5, and/or 10, and utilizing, for example, the processes and/or algorithms described herein in relation to FIGS. 4, 5, and/or 10.

Figure 9:
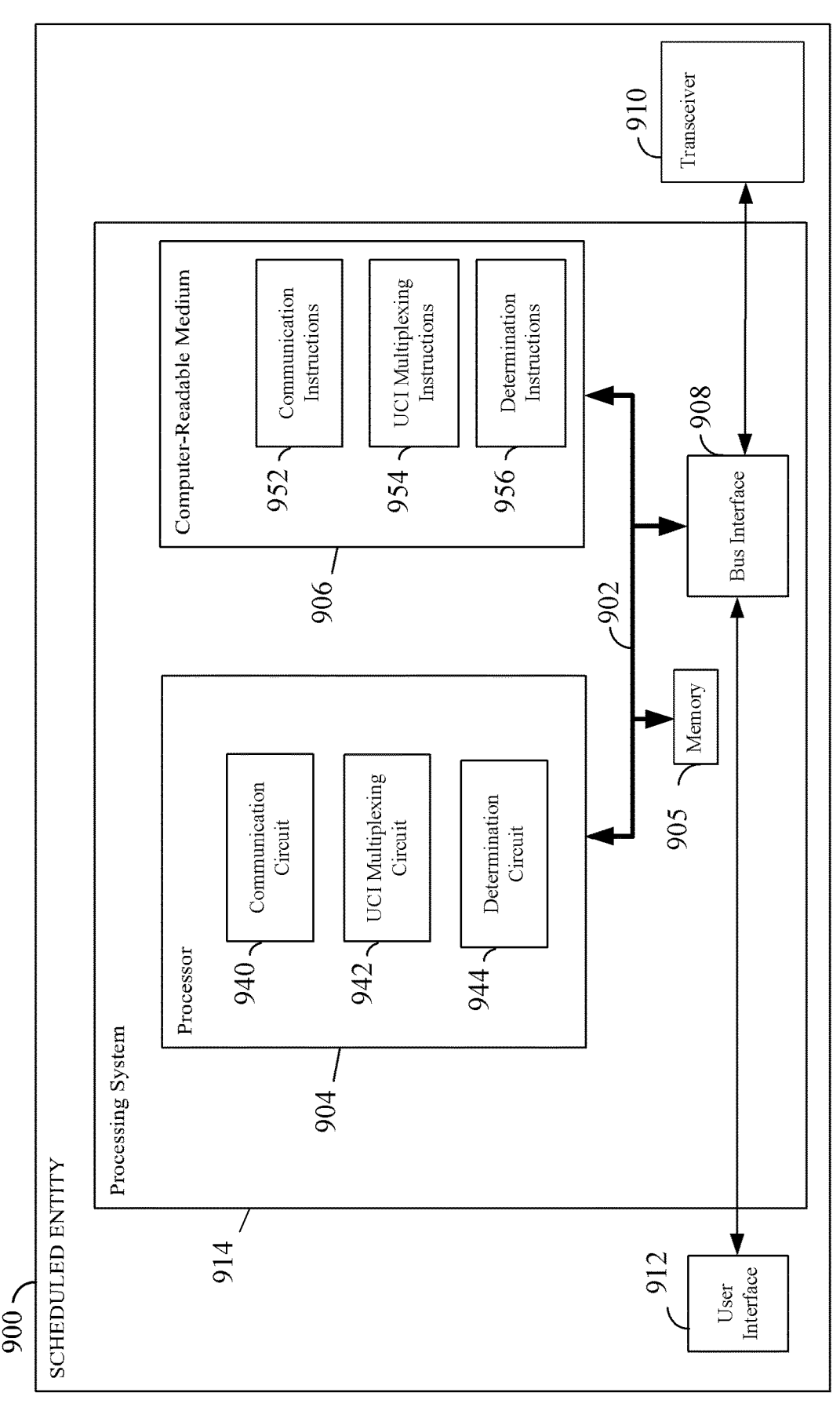
FIG. 9 is a block diagram conceptually illustrating an example of a hardware implementation for a scheduled entity according to some aspects of the disclosure.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of FIGS. 1, 2, 4, 5, and/or 10.

The processing system 914 may be substantially the same as the processing system 814 illustrated in FIG. 8, including a bus interface 908, a bus 902, memory 906, a processor 904, and a computer-readable medium 906. Furthermore, the scheduled entity 900 may include a user interface 912 and a transceiver 910 substantially similar to those described above in FIG. 8. That is, the processor 904, as utilized in a scheduled entity 900, may be configured (e.g., in coordination with the memory 905) to implement any one or more of the processes described below and illustrated in FIGS. 4, 5 and/or 10.

In some aspects of the disclosure, the processor 904 may include communication circuitry 940 configured (e.g., in coordination with the memory 905) for various functions, including, e.g., transmitting (e.g., via the transceiver 910) on an uplink traffic channel and/or an uplink control channel, and/or receiving (e.g., via the transceiver 910) on a downlink traffic channel and/or a downlink control channel. For example, the communication circuitry 940 may be configured to implement one or more of the functions described below in relation to FIGS. 4, 5 and/or 10. The processor 904 can further include an UCI multiplexing circuit 942 for multiplexing UCI with an UL message on a data region of a slot with or without repetition(s) of the UL message in initial UL transmission or UL retransmission, and can include a determination circuit 844 for determining a number of repetitions of the UL message with or without UCI on a data region of a respective slot.

And further, the computer-readable storage medium 906 may store computer-executable code that includes communication instructions 952 that configure a UE 900 for various functions, including, e.g., transmitting on an uplink traffic channel and/or an uplink control channel; and/or receiving and demodulating a downlink traffic channel and/or a downlink control channel (e.g., via the transceiver 910). For example, the communication instructions 960 may be configured to cause a UE 900 to implement one or more of the functions described below in relation to FIGS. 4, 5, and/or 10. As shown in FIG. 9, the computer-readable storage medium 906 can include communication instructions 952 for instructing, appropriately, the communication circuit 940, can include UCI multiplexing instructions 954 for instructing, appropriately, the UCI multiplexing circuit 942, and can include determination instructions 956 for instructing, appropriately, the determination circuit 944.

In one configuration, the UE 900 includes means for transmitting on an uplink traffic channel and/or uplink control channel; means for receiving and demodulating a downlink traffic channel and/or downlink control channel, means for multiplexing an UP message with UCI on a data region of a slot, means for determining the number of repetitions of the UL message. In one aspect, the aforementioned means may be the processor(s) 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the 1, 2, 4, 5, 6, 7, 8, 9 and/or 10, and utilizing, for example, the processes and/or algorithms described herein in relation to FIGS. 5, 6 and/or 9.

Figure 10:
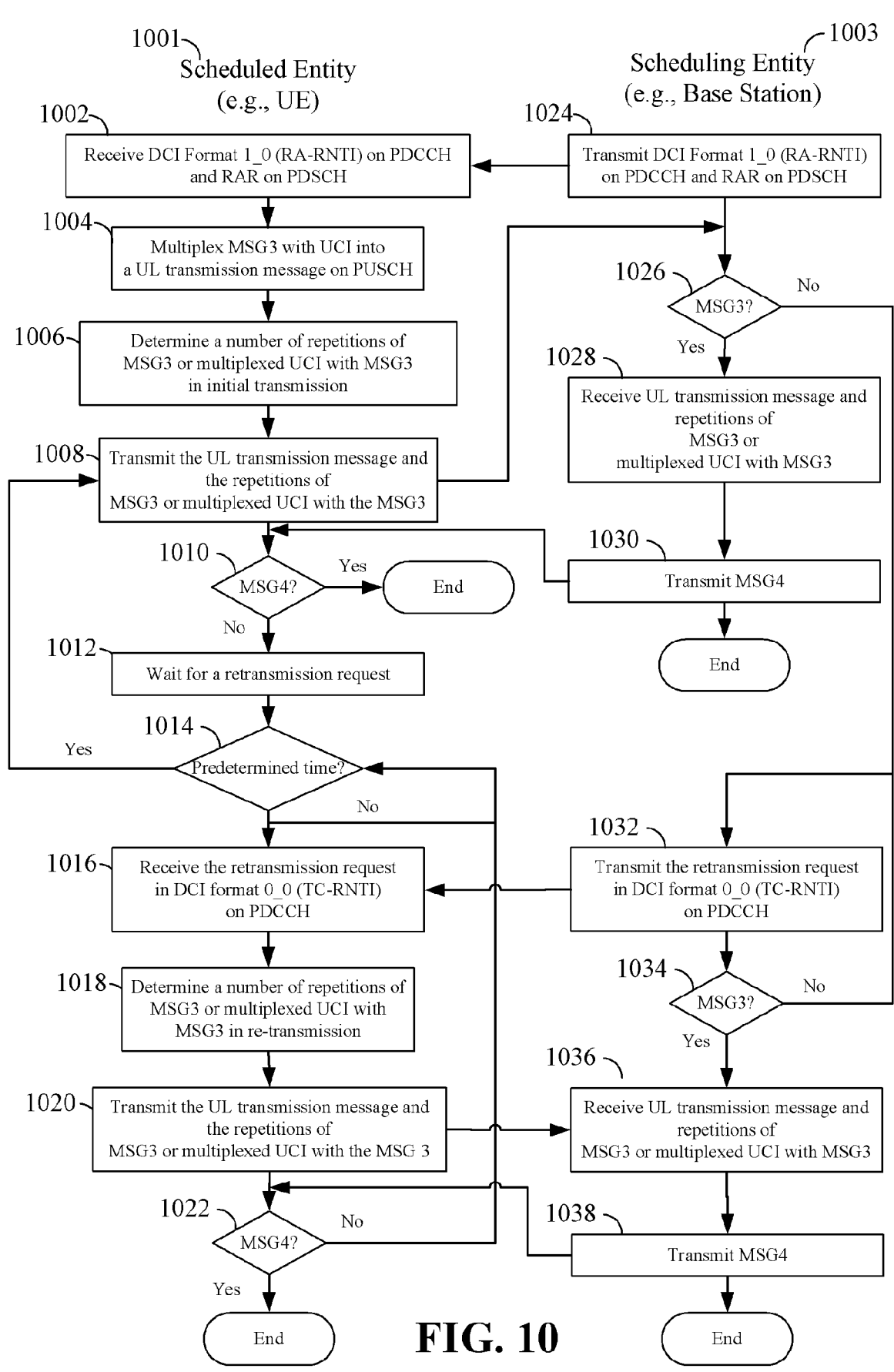
FIG. 10 is a flow chart illustrating an exemplary process for a random access procedure according to some aspects of the disclosure.

FIG. 10 illustrates an exemplary process for transmitting/receiving multiplexed UCI with a message employing repetition as part of a random access procedure according to some aspects of this disclosure. As described below, some or all illustrated features may be omitted in a particular implementation within the scope of the present disclosure, and some illustrated features may not be required for implementation of all embodiments. In some examples, the process may be carried out by a scheduled entity (e.g., a UE) 1001 and a scheduling entity (e.g., a base station) 1003. In some examples, the process may be carried out by any suitable apparatus or means for carrying out the functions or algorithm described below.

In some examples, a UE 1001 may receive system information (e.g., via a system information block, SIB) from the base station 1003 (not illustrated). The system information may include cell access information that, when received by the UE 1001, may enable the UE 1001 to begin a random access procedure. In some aspects of this disclosure, a system information message (e.g., SIB) may further include a scaling factor message or beta factor to indicate a coding rate of UCI where the UE 1001 may determine resources for the UCI based on the scaling factor message. The determining of resources may include determining an amount or type of resources.

The UE 1001 may initiate the random access procedure with the base station 1003 by transmitting a random access request (MSG1), or RACH preamble to the base station 1003 over a physical random access channel (PRACH) (not illustrated). If the base station 1003 receives MSG1 504, the base station 1003 can derive a random access-radio network temporary identifier (RA-RNTI) corresponding to the UE 1001 (e.g., based on MSG1).

After transmitting MSG1, the UE 501 may monitor for an RAR message 506 from the base station 503. That is, the UE 501 may monitor for a PDCCH including a DCI with a CRC scrambled by the RA-RNTI. However, if the base station 503 does not properly receive or decode the MSG1 transmission, then the base station 503 may not transmit such a response. Here, if the UE 501 does not receive its expected response, e.g., after a suitable timeout period, the UE 501 may retransmit MSG1 504 one or more subsequent times.

At block 1024, the base station or gNB 1003 may transmit a PDCCH including a DCI with a CRC scrambled by the RA-RNTI; a DCI for scheduling a corresponding PDSCH; and the corresponding PDSCH, including a random access response (RAR) message (MSG2). In various examples, the DCI for scheduling the PDSCH carrying the RAR message may utilize DCI format 1_0. The DCI with a CRC scrambled by the RA-RNTI may include the scaling factor message or beta factor to indicate a coding rate of UCI for the UE 1001 to determine resources for the UCI. The determining of resources may include determining an amount or type of resources.

Among other things, this RAR message may provide the UE 1001 with a grant or scheduling information indicating UL resources for the UE 1001 to use for an UL transmission (e.g., for MSG3). The UL resources may include resources for MSG3 on a PUSCH, and/or resources for UCI on the same PUSCH, and/or resources for MSG3 repetition. Here, the MSG3 repetition is that a given UL transmission may include multiple MSG3s, and the UE may transmit the multiple MSG3s 510 at the same time. Here, each of multiple repetitions of MSG3 may include MSG3 alone or MSG3 with the UCI on a data region of a respective slot. In addition, the RAR message may further include a scaling factor message or the beta factor to indicate a coding rate of UCI for the UE 1001 to determine resources for the UCI.

At block 1002, the UE 1001 receives, from the base station 1003, the RAR message. Based on the information in the RAR message, the UE 1001 may exploit allocated UL resources for a UL transmission (e.g., for MSG3). Thus, the UE 1001 may generate and transmit a UL message (e.g., MSG3, multiplexed MSG3 and UCI, and/or MSG3 repetitions) using the allocated UL resources.

At block 1004, the UE 1001 may multiplex a message (e.g., MSG3) with UCI on the allocated UL resources for the UL transmission. In order to multiplex the message with UCI on the allocated UL resources, the UE may determine the amount of resources or the number of resource elements for the UCI. The determination may be based on the scaling factor message/beta factor. In a previous phase of the random access procedure, the UE 1001 may receive the scaling factor message from the base station 1003 through various media. For example, the UE 1001 may receive the scaling factor message in the system information, an RAR message, an RRC message, a DCI with a CRC scrambled by the RA-RNTI, or any other suitable message from the base station 1003. Based on the allocated resources and the determined resources for the UCI, the UE 1001 may multiplex MSG3 with the UCI on a data region of an allocated slot. That is, the UE 1001 may map the UCI and MSG3 on available resource elements in a data region of an allocated slot or a PUSCH.

At block 1006, the UE 1001 may determine a number of MSG3 repetitions or multiplexed UCI with MSG3 in the UL transmission to the base station 1003. The UE 1001 may determine the number of MSG3 repetitions based on the number of available UL slots. For example, the base station 1003 may allocate three uplink slots for the UL transmission as part of the random access procedure. Then, the UE 1001 may determine three MSG3s including two MSG3 repetitions to be transmitted to the base station 1003. However, it should be appreciated that the determination of the number of repetitions is not limited to the number of available UL slots. The UE 1001 may receive the number of repetitions in system information, an RAR message, an RRC message, a DCI with a CRC scrambled by the RA-RNTI, or any other suitable message from the base station 1003.

Additionally, the UE may configure the arrangement for MSG3 repetition if a random access procedure supports MSG3 repetition for the initial UL transmission message. For example, the UE may multiplex MSG3 and UCI on a data region of a slot. For each MSG3 repetition, the UE may map MSG3 with or without UCI on a data region of a different and respective slot. Thus, the initial UL transmission message may include the first multiplexed MSG3 with UCI and one or more MSG3s with or without UCI for MSG3 repetition.

At block 1008, the UE 1001 may transmit the initial UL transmission message using PUSCH(s) to the base station 1003. The initial UL transmission message may include the first multiplexed MSG3 with UCI using a PUSCH and/or one or more MSG3s with or without UCI on corresponding one or more PUSCHs for MSG3 repetition.

At block 1026, the base station 1003 may determine whether the base station 1003 receives the initial UL transmission message (MSG3). The base station 1003 may know the resource allocation scheme in the initial UL transmission message (MSG3) including, but not limited to, resources for the UCI and the number of MSG3 repetitions. If the base station 1003 receives the initial UL transmission message (MSG3) at block 1028, the base station may transmits message 4 (MSG4) of the corresponding random access procedure at block 1030. In some cases, the base station 1003 may not correctly receive or decode the initial UL transmission message (MSG3). In some cases, the base station 1003 may determine, after a period of time of not properly receiving (and decoding) the initial UL transmission message (MSG3), to transmit the MSG3 retransmission request message at block 1032. In other configurations, the base station 1003 can determine whether to request the retransmission of MSG3, based on other parameters and conditions (e.g., the amount of the MSG3 properly decoded, etc.).

Accordingly, at block 1032, the base station 1003 may transmit a request for UE retransmission of MSG3. In some configurations, the MSG3 retransmission request message may include a PDCCH that carries a DCI with a CRC scrambled by the TC-RNTI indicated in the MSG3 retransmission request message. For example, the DCI in MSG3 retransmission request message may utilize DCI format 0_0. DCI format 0_0 may include (among other things) the following information: 1 (reserved) bit identified as a New Data Indicator and 4 (reserved) bits identified as a HARQ process number. The UE 1001 may employ the reserved bits for the scaling factor message to determine resources for UCI in a UL retransmission message. Further, the MSG3 retransmission request message may provide the UE 1001 with the same grant or scheduling information as the information the UE 501 uses for the initial UL transmission message (e.g., for MSG3 with UCI and/or MSG3 repetition(s)). However, the MSG3 retransmission request message may provide the UE 510 with different grant or scheduling information from the information the UE 501 uses for the initial UL transmission message (e.g., for MSG3 and/or MSG3 repetition(s)) for various reasons as described above.

In some cases, the UE 1001 may not correctly receive or decode the MSG3 retransmission request message or MSG4 at block 1010. In some cases, the UE 1001 may determine, after a period of time of not properly receiving (and decoding) the MSG3 retransmission request message at block 1014, to transmit the initial UL transmission message at block 1008. In other configurations, the UE 1001 can determine whether to retransmit the initial UL transmission message, based on other parameters and conditions (e.g., the amount of the MSG3 retransmission request message properly decoded, etc.). In that case, at block 1008, the UE 1001 may retransmit the initial UL transmission message which is already allocated on the corresponding PUSCH.

In some cases, at block 1016, the UE 1001 may correctly receive the MSG3 retransmission request message. Based on the MSG3 retransmission request message, at block 1018, the UE 1001 may merely retransmit the initial UL transmission message including MSG3 multiplexed with UCI on the data region of the already allocated slot and/or MSG3 repetitions (e.g., MSG3(s) multiplexed with/without UCI). In other cases, the UE 1001 may utilize newly allocated resources corresponding to the UL grant received in the DCI in the MSG3 retransmission request message. That is, the base station 503 may reallocate resources for MSG3 and UCI on a data region of a slot and/or MSG3 repetitions (e.g., MSG3(s) multiplexed with/without UCI) because of different conditions and parameters (e.g., coding rate change for the UCI, UCI contents change, etc.). The UE 1001 may determine the amount of resources for the UCI based on the scaling factor message/beta factor. In a previous phase of the random access procedure, the UE 1001 may receive the scaling factor message from the base station 1003 through various media. For example, the UE 1001 may receive the scaling factor message for the UL retransmission message in the system information, an RAR message, an RRC message, a DCI with a CRC scrambled by the TC-RNTI, or any other suitable message from the base station 1003. In particular, the DCI format 0_0 may include a 1-bit New Data Indicator and/or a 4-bit HARQ Process Number. The New Data Indicator and/or the HARQ Process Number may be used as repurposed bits or fields for the scaling factor message. In addition, the scaling factor message may use another reserved bits or filed in the DCI format 0_0. Based on the newly allocated resources and the determined amount of resources for the UCI, the UE 1001 may multiplex MSG3 with the UCI on a data region of a newly allocated slot. That is, the UE 1001 may map the UCI and MSG3 on available resource elements in a data region of an allocated slot or a PUSCH.

Additionally, the UE may configure the arrangement for MSG3 repetition for the UL retransmission message. For example, the UE may multiplex MSG3 and UCI on a data region of a newly allocated slot. For each MSG3 repetition, the UE may map MSG3 with or without UCI on a data region of a different and respective slot. In addition, the UE may use some of the already allocated UL resources and use newly allocated resources for MSG3 repetition. Thus, the initial UL transmission message may include the first multiplexed MSG3 with UCI and one or more MSG3s with or without UCI for MSG3 repetition.

At block 1020, the UE 1001 may transmit the UL retransmission message using PUSCH(s) to the base station 1003. The UL retransmission message may include the first multiplexed MSG3 with UCI using a PUSCH and/or one or more MSG3s with or without UCI on corresponding one or more PUSCHs for MSG3 repetition.

At block 1036, the base station 1003 may receive the UL retransmission message. If the base station 1003 may not receive the UL retransmission message, the base station 1003 may retransmit the MSG3 retransmission request message to the UE 1001. Once the base station 1003 receives the UL retransmission message, the base station 1003 may transmit MSG4 to the UE 1001 at block 1038.

At block 1022, the UE 1001 may wait for MSG4 from the base station 1003. If the UE 1001 does not receive MSG4, the UE may transmit the UL transmission at block 1008 or receive another UL retransmission message request at block 1016. In some cases, the UE 1001 may receive MSG4 and complete the random access procedure.

Further Examples Having a Variety of Features:

Example 1: A method of wireless communication operable at a user equipment (UE), comprising: initiating a random access procedure with a base station; generating an uplink (UL) transmission message comprising a UL message and uplink control information (UCI) on a data region of a first slot; and transmitting the UL transmission message as part of the random access procedure. In a related alternative example, a method of communication at a UE may include the UE communicating with a base station via a random access attempt and transmitting an UL transmission as part of the random access attempt. The UL transmission may include control and data information (e.g., a UL data message and/or UCI control message).

Example 2: The method of Example 1, further comprising: receiving a retransmission request to retransmit the UL message; and transmitting, in response to the received retransmission request, a UL retransmission message comprising the UL message and the UCI on the data region of the first slot.

Example 3: The method of Examples 1 or 2, wherein the UL retransmission message further comprises at least one of: the UL message; or the UL message and the UCI on a data region of a second slot.

Example 4: The method of Examples 1 or 2, further comprising: receiving an scaling factor message to indicate a coding rate of the UCI; and determining resources for the UCI based on the scaling factor message.

Example 5: The method of Example 4, wherein the receiving a scaling factor message comprises: receiving a DCI in association with the retransmission request from the base station to retransmit the UL message, the DCI comprising one or more bits configured to indicate the scaling factor message.

Example 6: The method of Example 5, wherein the one or more bits configured to indicate the scaling factor message comprise at least one of: one or more reserved bits from a first set of reserved bits or a second set of repurposed reserved fields in a DCI format 0_0 with a cyclic redundancy check (CRC) scrambled by a temporary cell-radio network temporary identifier (TC-RNTI).

Example 7: The method of Example 6, wherein the one or more bits correspond to one or both of a New Data Indicator field, or a HARQ process number field.

Example 8: The method of Example 4, further comprising: receiving system information from the base station; and receiving a random access response (RAR) from the base station as part of the random access procedure, wherein the scaling factor message is received in at least one of: the system information; the RAR; or the retransmission request from the base station to retransmit the UL message.

Example 9: The method of Example 1, wherein the UCI comprises at least one of: a UE capability indication for indicating UE support of a UL message repetition feature; a UE capability indication for indicating UE support of physical uplink shared channel (PUSCH) repetition type A feature by counting a number of repetitions based on available UL slots; a UE capability indication for indicating UE support of a PUSCH demodulation reference signal (DMRS) bundling feature for the repetition of the UL message; or a channel state information (CSI) report.

Example 10: The method of Example 1, wherein the UL transmission message further comprises at least one of: the UL message; or the UL message and the UCI on a data region of a second slot.

Example 11: The method of Example 1, further comprising: receiving a scaling factor message to indicate a coding rate for the UCI; and determining resources for the UCI based on the scaling factor message.

Example 12: The method of Example 11, wherein the receiving the scaling factor message comprises: receiving downlink control information (DCI) in association with a random access response message from the base station, the DCI comprising one or more bits configured to indicate the scaling factor message.

Example 13: The method of Example 12, wherein the one or more bits configured to indicate the scaling factor message comprise one or more reused bits from a set of reserved bits in a DCI format 1_0 with a cyclic redundancy check (CRC) scrambled by a random access-radio network temporary identifier (RA-RNTI).

Example 14: A method of wireless communication operable at a base station, comprising: at least one of: receiving, from a user equipment (UE), an uplink (UL) transmission message comprising a UL message and uplink control information (UCI) on a data region of a first slot as part of a random access procedure, or receiving a UL retransmission message comprising the UL message and the UCI on the data region of the first slot as part of the random access procedure.

Example 15: The method of Example 14, further comprising: transmitting a retransmission request to receive the UL message.

Example 16: The method of Example 14, wherein the UCI comprises at least one of: a UE capability indication for indicating UE support of a UL message repetition feature; a UE capability indication for indicating UE support of physical uplink shared channel (PUSCH) repetition type A feature by counting a number of repetitions based on available UL slots; a UE capability indication for indicating UE support of a PUSCH demodulation reference signal (DMRS) bundling feature for the repetition of the UL message; or a channel state information (CSI) report.

Example 17: The method of Example 14, further comprising: allocating a second slot for a repetition of the UL message, wherein the UL transmission message further comprises at least one of: the UL message; or the UL message and the UCI on a data region of a second slot.

Example 18: The method of Example 14, further comprising: allocating a second slot for a repetition of the UL message, wherein the UL retransmission message further comprises at least one of: the UL message; or the UL message and the UCI on a data region of a second slot.

Example 19: The method of Example 14, further comprising: transmitting a scaling factor message to indicate a coding rate for the UCI.

Example 20: The method of Example 19, wherein the transmitting the scaling factor message comprises: transmitting downlink control information (DCI) in association with a random access response message, the DCI comprising one or more bits configured to indicate the scaling factor message.

Example 21: The method of Example 20, wherein the one or more bits configured to indicate the scaling factor message comprise one or more reused bits from a set of reserved bits in a DCI format 1_0 with a cyclic redundancy check (CRC) scrambled by a random access-radio network temporary identifier (RA-RNTI).

Example 22: The method of Example 19, wherein the transmitting a scaling factor message comprises: transmitting a DCI in association with the retransmission request to receive the UL message, the DCI comprising one or more bits configured to indicate the scaling factor message.

Example 23: The method of Example 22, wherein the one or more bits configured to indicate the scaling factor message comprise at least one of: one or more reserved bits from a first set of reserved bits or a second set of repurposed reserved fields in a DCI format 0_0 with a cyclic redundancy check (CRC) scrambled by a temporary cell-radio network temporary identifier (TC-RNTI).

Example 24: The method of Example 23, wherein the one or more bits correspond to one or both of a New Data Indicator field, or a HARQ process number field.

Example 25: The method of Example 19, further comprising: transmitting system information to the UE; and transmitting a random access response (RAR) as part of the random access procedure, wherein the scaling factor message is transmitted in at least one of: the system information; the RAR; or the retransmission request to receive the UL message.

Example 26: An apparatus for wireless communication, comprising: means for initiating a random access procedure with a base station; means for generating an uplink (UL) transmission message comprising a UL message and uplink control information (UCI) on a data region of a first slot; and means for transmitting the UL transmission message as part of the random access procedure.

Example 27: The apparatus of Example 26, further comprising: means for receiving a retransmission request to retransmit the UL message; and means for transmitting, in response to the received retransmission request, a UL retransmission message comprising the UL message and the UCI on the data region of the first slot.

Example 28: The apparatus of Example 27, further comprising: means for receiving an scaling factor message to indicate a coding rate of the UCI; and means for determining resources for the UCI based on the scaling factor message.

Example 29: A base station for wireless communication, comprising: at least one of: means for receiving, from a user equipment (UE), an uplink (UL) transmission message comprising a UL message and uplink control information (UCI) on a data region of a first slot as part of a random access procedure, or means for receiving a UL retransmission message comprising the UL message and the UCI on the data region of the first slot as part of the random access procedure.

Example 30: The base station of Example 29, further comprising: means for transmitting a retransmission request to receive the UL message.

Example 31: The base station of Example 29, further comprising: means for allocating a second slot for a repetition of the UL message.

Example 32: The base station of Example 29, further comprising: transmitting a scaling factor message to indicate a coding rate for the UCI.

Example 33: A non-transitory computer-readable medium storing computer-executable code, comprising code for causing a user equipment (UE) to: initiate a random access procedure with a base station; generate an uplink (UL) transmission message comprising a UL message and uplink control information (UCI) on a data region of a first slot; and transmit the UL transmission message as part of the random access procedure.

Example 34: The non-transitory computer-readable medium of Example 33, wherein the code for causing the UE further to: receive a retransmission request to retransmit the UL message; and transmit, in response to the received retransmission request, a UL retransmission message comprising the UL message and the UCI on the data region of the first slot.

Example 35: The non-transitory computer-readable medium of Example 34, wherein the code for causing the UE further to: receive an scaling factor message to indicate a coding rate of the UCI; and determine resources for the UCI based on the scaling factor message.

Example 36: A non-transitory computer-readable medium storing computer-executable code, comprising code for causing a base station to: at least one of: receive, from a user equipment (UE), an uplink (UL) transmission message comprising a UL message and uplink control information (UCI) on a data region of a first slot as part of a random access procedure, or receive a UL retransmission message comprising the UL message and the UCI on the data region of the first slot as part of the random access procedure.

Example 37: The non-transitory computer-readable medium of Example 36, wherein the code for causing the base station further to: transmit a retransmission request to receive the UL message.

Example 38: The non-transitory computer-readable medium of Example 36, wherein the code for causing the base station further to: allocate a second slot for a repetition of the UL message.

Example 39: The non-transitory computer-readable medium of Example 36, wherein the code for causing the base station further to: transmit a scaling factor message to indicate a coding rate for the UCI.

Example 40: An apparatus for wireless communication, comprising: a processor; a transceiver communicatively coupled to the processor; and a memory communicatively coupled to the processor, wherein the processor is configured to: initiate a random access procedure with a base station; generate an uplink (UL) transmission message comprising a UL message and uplink control information (UCI) on a data region of a first slot; and transmit the UL transmission message as part of the random access procedure.

Example 41: The apparatus of Example 40, wherein the processor is further configured to: receive a retransmission request to retransmit the UL message; and transmit, in response to the received retransmission request, a UL retransmission message comprising the UL message and the UCI on the data region of the first slot.

Example 42: The non-transitory computer-readable medium of Example 41, wherein the code for causing the UE further to: receive an scaling factor message to indicate a coding rate of the UCI; and determine resources for the UCI based on the scaling factor message.

Example 43: A base station for wireless communication, comprising: a processor; a transceiver communicatively coupled to the processor; and a memory communicatively coupled to the processor, wherein the processor is configured to: at least one of: receive, from a user equipment (UE), an uplink (UL) transmission message comprising a UL message and uplink control information (UCI) on a data region of a first slot as part of a random access procedure, or receive a UL retransmission message comprising the UL message and the UCI on the data region of the first slot as part of the random access procedure.

Example 44: The base station of Example 43, wherein the processor is further configured to: transmit a retransmission request to receive the UL message.

Example 45: The base station of Example 43, wherein the processor is further configured to: allocate a second slot for a repetition of the UL message.

Example 46: The base station of Example 43, wherein the processor is further configured to: transmit a scaling factor message to indicate a coding rate for the UCI.

Example 47: A communication system comprising one or more wireless devices configured for wireless communication, a communication device comprising: a communication interface configured to communicate with a base station via a random access procedure; a processor configured to generate an uplink (UL) transmission message comprising a UL message and uplink control information (UCI) on a data region of a first slot; and one or more radiating antenna elements configured to transmit the UL transmission message as part of the random access procedure.

Example 48: A method of communication at a UE, the method comprising: communicating with a base station via a random access attempt and transmitting an UL transmission as part of the random access attempt, wherein the UL transmission comprises control and data information.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a user equipment (UE), comprising:
initiating a random access procedure with a base station;
generating an uplink (UL) transmission message comprising a UL message and uplink control information (UCI) on a data region of a first slot; and
transmitting the UL transmission message as part of the random access procedure;
receiving a retransmission request to retransmit the UL message;
receiving a scaling factor message to indicate a coding rate of the UCI; and
transmitting, in response to the received retransmission request and the received scaling factor message, a UL retransmission message comprising the UL message and the UCI on the data region of the first slot.

2. The method of claim 1, wherein the UL retransmission message further comprises the UL message and the UCI on a data region of a second slot.

3. The method of claim 1, further comprising:
determining resources for the UCI based on the scaling factor message.

4. The method of claim 3, further comprising:
receiving system information from the base station; and
receiving a random access response (RAR) from the base station as part of the random access procedure,
wherein the scaling factor message is received in at least one of:
the system information;
the RAR; or
the retransmission request from the base station to retransmit the UL message.

5. The method of claim 1, wherein the receiving the scaling factor message comprises:
receiving a DCI in association with the retransmission request from the base station to retransmit the UL message, the DCI comprising one or more bits configured to indicate the scaling factor message.

6. The method of claim 5, wherein the one or more bits configured to indicate the scaling factor message comprise at least one of: one or more reserved bits from a first set of reserved bits or a second set of repurposed reserved fields in a DCI format 0_0 with a cyclic redundancy check (CRC) scrambled by a temporary cell-radio network temporary identifier (TC-RNTI).

7. The method of claim 6, wherein the one or more bits correspond to one or both of a New Data Indicator field, or a HARQ process number field.

8. The method of claim 1, wherein the UCI comprises at least one of:
a UE capability indication for indicating UE support of a UL message repetition feature;
a UE capability indication for indicating UE support of physical uplink shared channel (PUSCH) repetition type A feature by counting a number of repetitions based on available UL slots;
a UE capability indication for indicating UE support of a PUSCH demodulation reference signal (DMRS) bundling feature for the repetition of the UL message; or
a channel state information (CSI) report.

9. The method of claim 1, wherein the UL transmission message further comprises the UL message and the UCI on a data region of a second slot.

10. The method of claim 1, wherein the receiving the scaling factor message comprises:
receiving downlink control information (DCI) in association with a random access response message from the base station, the DCI comprising one or more bits configured to indicate the scaling factor message.

11. The method of claim 10, wherein the one or more bits configured to indicate the scaling factor message comprise one or more reused bits from a set of reserved bits in a DCI format 1_0 with a cyclic redundancy check (CRC) scrambled by a random access-radio network temporary identifier (RA-RNTI).

12. A method of wireless communication operable at a base station, comprising: at least one of:
receiving, from a user equipment (UE), an uplink (UL) transmission message comprising a UL message and uplink control information (UCI) on a data region of a first slot as part of a random access procedure, or
transmitting a retransmission request to receive the UL message;
transmitting a scaling factor message to indicate a coding rate for the UCI; and receiving a UL retransmission message comprising the UL message and the UCI on the data region of the first slot as part of the random access procedure.

13. The method of claim 12, wherein the UCI comprises at least one of:
a UE capability indication for indicating UE support of a UL message repetition feature;
a UE capability indication for indicating UE support of physical uplink shared channel (PUSCH) repetition type A feature by counting a number of repetitions based on available UL slots;
a UE capability indication for indicating UE support of a PUSCH demodulation reference signal (DMRS) bundling feature for the repetition of the UL message; or
a channel state information (CSI) report.

14. The method of claim 12, further comprising:
allocating a second slot for a repetition of the UL message,
wherein the UL transmission message further comprises the UL message and the UCI on a data region of a second slot.

15. The method of claim 12, wherein the transmitting the scaling factor message comprises:
transmitting downlink control information (DCI) in association with a random access response message, the DCI comprising one or more bits configured to indicate the scaling factor message.

16. The method of claim 15, wherein the one or more bits configured to indicate the scaling factor message comprise one or more reused bits from a set of reserved bits in a DCI format 1_0 with a cyclic redundancy check (CRC) scrambled by a random access-radio network temporary identifier (RA-RNTI).

17. The method of claim 12, wherein the transmitting a scaling factor message comprises:
transmitting a DCI in association with the retransmission request to receive the UL message, the DCI comprising one or more bits configured to indicate the scaling factor message.

18. The method of claim 17, wherein the one or more bits configured to indicate the scaling factor message comprise at least one of: one or more reserved bits from a first set of reserved bits or a second set of repurposed reserved fields in a DCI format 0_0 with a cyclic redundancy check (CRC) scrambled by a temporary cell-radio network temporary identifier (TC-RNTI).

19. An apparatus for wireless communication, comprising:
one or more processors;
a transceiver communicatively coupled to the one or more processors; and
one or more memories communicatively coupled to the one or more processors,
wherein the one or more processors are configured to cause the apparatus to:
initiate a random access procedure with a base station;
generate an uplink (UL) transmission message comprising a UL message and uplink control information (UCI) on a data region of a first slot; and
transmit the UL transmission message as part of the random access procedure
receive a retransmission request to retransmit the UL message;
receive a scaling factor message to indicate a coding rate of the UCI; and
transmit, in response to the received retransmission request and the received scaling factor message, a UL retransmission message comprising the UL message and the UCI on the data region of the first slot.

20. The apparatus of claim 19, wherein the one or more processors are further configured to cause the apparatus to:
determine resources for the UCI based on the scaling factor message.

21. The apparatus of claim 19, wherein the UL retransmission message further comprises the UL message and the UCI on a data region of a second slot.

22. The apparatus of claim 19, wherein the one or more processors configured to cause the apparatus to receive the scaling factor message are further configured to cause the apparatus to:
receive a DCI in association with the retransmission request from the base station to retransmit the UL message, the DCI comprising one or more bits configured to indicate the scaling factor message.

23. The apparatus of claim 22, wherein the one or more bits configured to indicate the scaling factor message comprise at least one of: one or more reserved bits from a first set of reserved bits or a second set of repurposed reserved fields in a DCI format 0_0 with a cyclic redundancy check (CRC) scrambled by a temporary cell-radio network temporary identifier (TC-RNTI).

24. The apparatus of claim 23, wherein the one or more bits correspond to one or both of a New Data Indicator field, or a HARQ process number field.

25. A base station for wireless communication, comprising:
one or more processors;
a transceiver communicatively coupled to the processor; and
one or more memories communicatively coupled to the one or more processors,
wherein the one or more processors are configured to cause the base station to:
receive, from a user equipment (UE), an uplink (UL) transmission message comprising a UL message and uplink control information (UCI) on a data region of a first slot as part of a random access procedure;
transmit a retransmission request to receive the UL message;
transmit a scaling factor message to indicate a coding rate for the UCI; and
receive a UL retransmission message comprising the UL message and the UCI on the data region of the first slot as part of the random access procedure.

26. The base station of claim 25, wherein the one or more processors are further configured to cause the base station to:
allocate a second slot for a repetition of the UL message.

27. The base station of claim 25, wherein the UCI comprises at least one of:
a UE capability indication for indicating UE support of a UL message repetition feature;
a UE capability indication for indicating UE support of physical uplink shared channel (PUSCH) repetition type A feature by counting a number of repetitions based on available UL slots;
a UE capability indication for indicating UE support of a PUSCH demodulation reference signal (DMRS) bundling feature for the repetition of the UL message; or
a channel state information (CSI) report.

28. The base station of claim 25, wherein the one or more processors are further configured to cause the base station to:

allocate a second slot for a repetition of the UL message, wherein the UL transmission message further comprises the UL message and the UCI on a data region of a second slot.

29. The base station of claim 25, wherein the one or more processors configured to cause the base station to transmit the scaling factor message are further configured to cause the base station to:

transmit downlink control information (DCI) in association with a random access response message, the DCI comprising one or more bits configured to indicate the scaling factor message.

30. The base station of claim 29, wherein the one or more bits configured to indicate the scaling factor message comprise one or more reused bits from a set of reserved bits in a DCI format 1_0 with a cyclic redundancy check (CRC) scrambled by a random access-radio network temporary identifier (RA-RNTI).

\* \* \* \* \*